United States Patent
Nakamura

(10) Patent No.: US 9,270,177 B1
(45) Date of Patent: Feb. 23, 2016

(54) SWITCHING POWER-SUPPLY DEVICE

(71) Applicant: Sanken Electric Co., LTD., Niiza-shi, Saitama (JP)

(72) Inventor: Masaru Nakamura, Niiza (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 0 days.

(21) Appl. No.: 14/549,193

(22) Filed: Nov. 20, 2014

(51) Int. Cl.
*H02J 3/12* (2006.01)
*G05F 1/00* (2006.01)
*H02M 3/158* (2006.01)
*H02M 1/088* (2006.01)
*H02M 1/00* (2007.01)

(52) U.S. Cl.
CPC .............. *H02M 3/158* (2013.01); *H02M 1/088* (2013.01); *H02M 2001/0016* (2013.01); *H02M 2001/0025* (2013.01)

(58) Field of Classification Search
USPC ............... 323/241–243, 246, 266, 274–277, 323/279–285, 288
See application file for complete search history.

(56) References Cited

U.S. PATENT DOCUMENTS

| 6,583,610 | B2 | 6/2003 | Groom et al. | |
|---|---|---|---|---|
| 2011/0304309 | A1* | 12/2011 | Nakamura | H02M 3/156 323/288 |
| 2012/0032660 | A1* | 2/2012 | Nakamura | H02M 3/156 323/288 |
| 2012/0032661 | A1* | 2/2012 | Nakamura | H02M 3/156 323/288 |
| 2012/0043949 | A1* | 2/2012 | Nakamura | H02M 3/1588 323/271 |
| 2014/0152277 | A1* | 6/2014 | Nakamura | H02M 3/156 323/271 |

FOREIGN PATENT DOCUMENTS

JP 2008-072809 A 3/2008

* cited by examiner

*Primary Examiner* — Adolf Berhane
*Assistant Examiner* — Gary Nash
(74) *Attorney, Agent, or Firm* — Banner & Witcoff, Ltd.

(57) ABSTRACT

A switching power-supply device is configured to convert and output a first direct voltage to a second direct voltage by alternately turning on and off a first switching element and a second switching element, the switching power-supply device includes: a reference voltage generation unit; a comparison unit; and a driving signal generation unit, wherein the driving signal generation unit controls the period of supplying the driving signal to the driving unit, depending on an input-and-output condition, and wherein the reference voltage generation unit starts rising of the ramp signal during a period from a time point, at which the first switching element has been turned from on to off in response to the driving signal, to when the first switching element is turned on.

11 Claims, 19 Drawing Sheets

SWITCHING POWER-SUPPLY DEVICE

TECHNICAL FIELD

This disclosure relates to a switching power-supply device.

BACKGROUND

In a switching power-supply device for supply a power source voltage to a digital signal processing LSI (large-scale integrated circuit) or the like, a high load response performance, which suppresses, as far as possible, a fluctuation range of an output voltage due to a digital load dynamically changed, is required. In response to this requirement for load response performance, a ripple converter, in which an error amplifier being a main cause of delay elements is not used and thus load response performance is improved, has been widely used (e.g., see specifications of U.S. Pat. No. 6,583,610 and Japanese Patent Application Publication No. 2008-72809).

Because such a classic ripple converter is a type which detects a ripple voltage of the output voltage to perform a feedback control, a capacitor, as an output capacitor, having a high ESR (Equivalent Series Resistance) or the like is required to obtain a sufficient ripple signal, thereby disturbing downsizing of the system.

Therefore, recently, superimposing a Ramp signal, which is assumed as a ripple due to the ESR of the output capacitor, with a feedback voltage is performed. According to this configuration, a stable operation is possible even if a ceramic capacitor having a low ESR is used as the output capacitor.

SUMMARY

An object of this disclosure is to provide a switching power-supply device which can be stably operated even if a ceramic capacitor having a low ESR is used as an output capacitor.

A switching power-supply device of this disclosure is configured to convert and output a first direct voltage supplied from an input power source to a second direct voltage by alternately turning on and off a first switching element connected to the input power source and a second switching element connected in series to the first switching element, and the switching power-supply device includes: a reference voltage generation unit that generates a ramp signal and generates a second reference voltage in which the ramp signal is superimposed with a first reference voltage; a comparison unit that compares a feedback voltage, which is obtained by resistance voltage dividing of the second direct voltage, with the second reference voltage and outputs an effective signal at a timing, at which the feedback voltage becomes lower than the second reference voltage; and a driving signal generation unit that receives the effective signal and then supplies a driving signal to an driving unit turning on the first switching element during a period, during which the driving signal is supplied, wherein the driving signal generation unit controls the period of supplying the driving signal to the driving unit, depending on an input-and-output condition, and wherein the reference voltage generation unit starts rising of the ramp signal during a period from a time point, at which the first switching element has been turned from on to off in response to the driving signal, to when the first switching element is turned on.

A switching power-supply device of this disclosure is configured to convert and output a first direct voltage supplied from an input power source to a second direct voltage by alternately turning on and off a first switching element connected to the input power source and a second switching element connected in series to the first switching element, and the switching power-supply device includes: a feedback voltage generation unit that generates a negative-sloped ramp signal and generates a feedback voltage in which the ramp signal is superimposed with a voltage obtained by resistance voltage dividing of the second direct voltage; a comparison unit that compares the feedback voltage with a reference voltage and outputs an effective signal at a timing, at which the feedback voltage becomes lower than the reference voltage; and a driving signal generation unit that receives the effective signal and then supplies a driving signal to an driving unit turning on the first switching element during a period, during which the driving signal is supplied; wherein the driving signal generation unit controls the period of supplying the driving signal to the driving unit, depending on an input-and-output conditions; and wherein the feedback voltage generation unit starts rising of the ramp signal during a period from a time point, at which the first switching element has been turned from on to off in response to the driving signal, to when the first switching element is turned on.

According to the switching power-supply device of this disclosure, a stable operation is possible even if a ceramic capacitor having a low ESR is used as an output capacitor.

BRIEF DESCRIPTION OF THE DRAWINGS

FIG. 13 is a view showing an example of a circuit configuration of a ramp generator 3a.

FIG. 17 is a view showing an example of a circuit configuration of a feed forward circuit 5a.

DESCRIPTION OF ILLUSTRATIVE EMBODIMENTS

Now, embodiments of this disclosure will be described with reference to the drawings.

Figure 1:
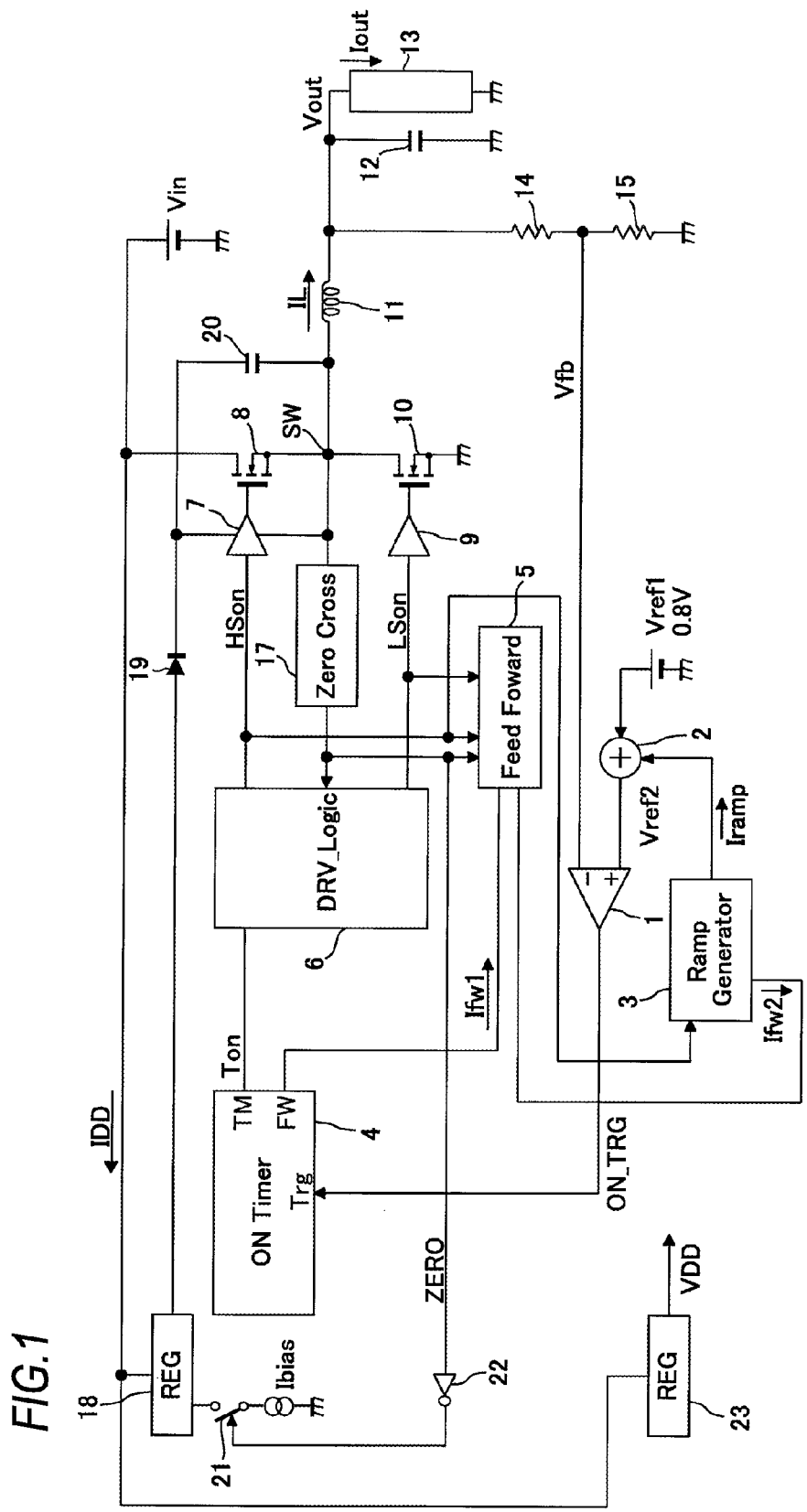
FIG. 1 is a circuit diagram of a switching power-supply device according to the present disclosure.

FIG. 1 is a circuit diagram of a switching power-supply device according to an embodiment of this disclosure.

The switching power-supply device shown in FIG. 1 includes a feedback comparator 1 serving as a comparison unit, a Ramp superimposing circuit 2 serving as a superimposing unit, a ramp generator 3, an on-timer (ON Timer) 4, a feed forward circuit (Feed Forward) 5, a drive logic (DRV_Logic) 6, a high-side drive 7 serving as a driving unit, a high-side MOSFET 8, which is a first switching element, a low-side drive 9, a low-side MOSFET 10, which is a second switching element, an inductor 11, an output capacitor 12, a feedback resistor 14, a feedback resistor 15, a zero-cross detection circuit 17 serving as a detection unit, a drive regulator (DRV_REG) 18, a diode 19, a bootstrap capacitor 20, a switch 21, a inverter 22, and a regulator for supplying a power source voltage VDD to each unit.

The switching power-supply device shown in FIG. 1 is adapted to convert and output a first direct voltage Vin, which is supplied from an input power source, into a second direct voltage (output voltage Vout) by alternately turning on and off the high-side MOSFET 8 and the low-side MOSFET 10.

The high-side MOSFET 8 is connected to the input power source for supplying the first direct voltage Vin.

The high-side MOSFET 8 is driven on and off as a gate voltage thereof is controlled by the high-side driver 7. The high-side driver 7 turns on the high-side MOSFET 8 during a period, during which a driving signal HSon supplied from the drive logic 6 is high, and turns off the high-side MOSFET 8 during other than the period.

The bootstrap capacitor 20 is connected to a power source terminal of the high-side drive 7 and a power source voltage is supplied from the bootstrap capacitor 20 to the high-side drive 7.

The bootstrap capacitor 20 is connected to the drive regulator 18 through the diode 19.

The drive regulator 18 is operated by the bias current Ibias2 supplied from the current source connected through the switch 21. The drive regulator 18 charges the bootstrap capacitor 20 through the diode 19 when the high-side MOSFET 8 is off and the low-side MOSFET 10 is on, thereby generating a power source voltage for the high-side drive 7.

The drive regulator 18, the diode 19 and the bootstrap capacitor 20 serve as a power supply circuit for supplying the power source voltage to the high-side drive 7.

The low-side MOSFET 10 is connected in series to the high-side MOSFET 8.

The low-side MOSFET 10 is driven on and off as a gate voltage thereof is controlled by the low-side driver 9. The low-side driver 9 turns on the low-side MOSFET 10 during a period, during which a driving signal LSon supplied from the drive logic 6 is high, and turns off the low-side MOSFET 10 during other than the period.

One end of the inductor 11 is connected to a connection point SW between the high-side MOSFET 8 and the lower side MOSFET 10, and the other end thereof is connected to a load circuit 13. A current flowing through the inductor 11 is referred to as an inductor current IL. The load circuit 13 is, for example, a digital signal processing LSI.

The output capacitor 12 is connected between a ground and a connection point between the inductor 11 and the load circuit 13.

The zero-cross detection circuit (Zero Cross) 17 serves as a detection unit for detecting that regeneration of the inductor 11 has been completed, based on a voltage signal of a connection point SW between the high-side MOSFET 8 and the low-side MOSFET 10.

Completion of regeneration of the inductor 11 means that energy accumulated in the inductor 11 while the high-side MOSFET 8 is being on is discharged from the inductor 11, after the high-side MOSFET 8 is turned off and the low-side MOSFET 10 is turned on, and then discharging is completed.

If regeneration of the inductor 11 is completed, polarity of the inductor current IL is reversed. The zero-cross detection circuit 17 detects that polarity of the inductor current IL has been reversed, based on the voltage signal of the connection point SW, and then switches a zero-cross detection signal ZERO, which is to be outputted to the inverter 22, the drive logic 6 and the feed forward circuit 5, to High. The zero-cross detection circuit 17 switches the zero-cross detection signal ZERO to Low if the high-side MOSFET 8 is turned on and polarity of the inductor current IL is again reversed.

The inverter 22 turns off the switch 21 during a period, during which the zero-cross detection signal ZERO is High, and turns on the switch 21 during a period, during which the zero-cross detection signal ZERO is Low.

Due to control of the switch 21 by the inverter 22, the drive regulator 18 stops operating until a driving signal HSon is switched to High after regeneration of the inductor 11 has been completed.

A serial circuit of the feedback resistor 14 and the feedback resistor 15 is connected between the ground and a connection point between the inductor 11 and the capacitor 12.

To an inverted input terminal of the feedback comparator 1, a connection point between the feedback resistor 14 and the feedback resistor 15 is connected. To a non-inverted input terminal of the feedback comparator 1, the Ramp superimposing circuit 2 is connected.

A feedback voltage Vfb, which is exhibited at the connection point between the feedback resistor 14 and the feedback resistor 15, is a voltage obtained by detecting the output voltage Vout by resistance voltage dividing with the feedback resistors 14 and 15.

The Ramp superimposing circuit 2 is connected to a power source for supplying a first reference voltage Vref1 and the ramp generator 3.

The Ramp superimposing circuit 2 overlaps a Ramp current signal Iramp (a positive-sloped signal in which a signal level thereof is linearly increased over time), which is generated by the ramp generator 3, with the first reference voltage Vref1 to generate a second reference voltage Vref2, and then outputs the second reference voltage Vref2 to the non-inverted input terminal of the feedback comparator 1.

Figure 2:
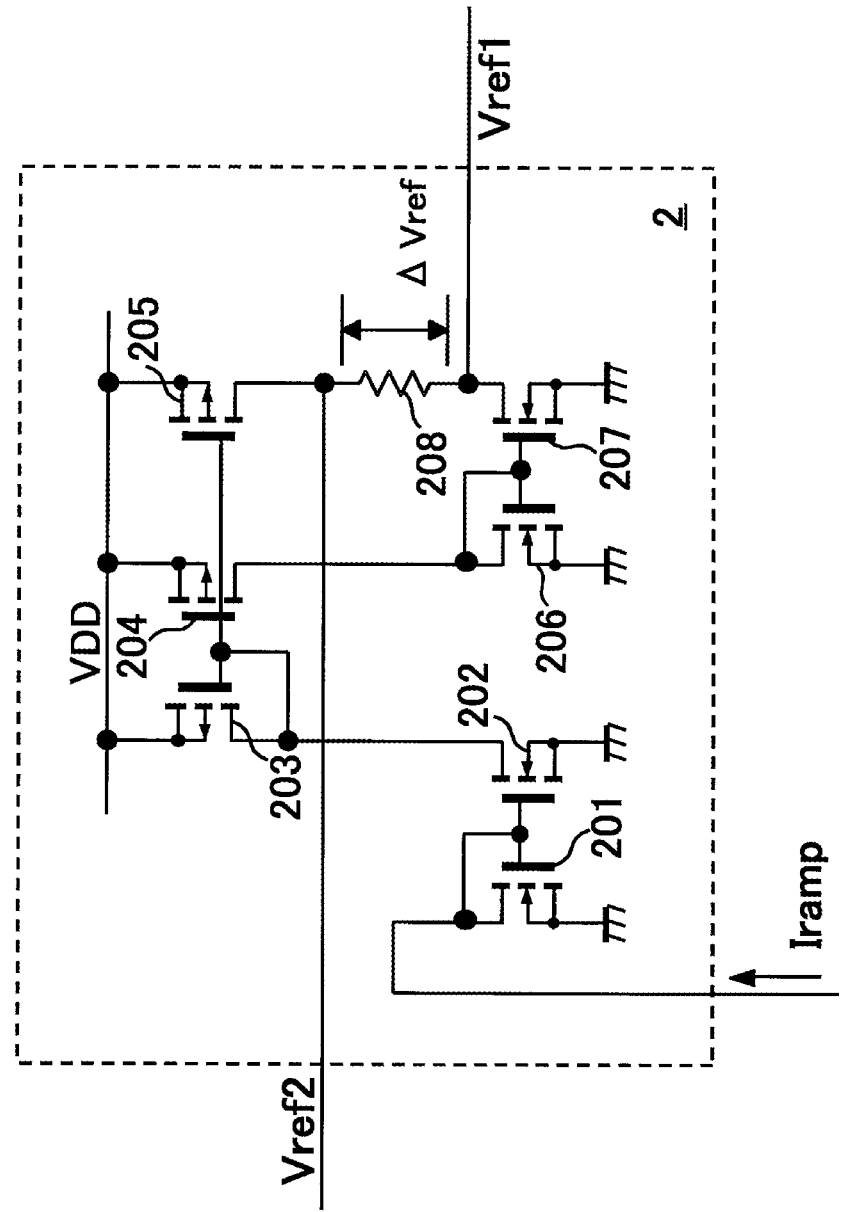
FIG. 2 is a view showing an example of a circuit configuration of a Ramp superimposing circuit 2.

FIG. 2 is a view showing an example of a circuit configuration of the Ramp superimposing circuit 2.

The Ramp superimposing circuit 2 includes MOSFETs 201 to 207 and a resistor 208. To a MOSFET 205 side terminal of the resistor 208, the non-inverted input terminal of the feedback comparator 1 is connected. To a MOSFET 207 side terminal of the resistor 208, the power source for supplying the first reference voltage Vref1 is connected.

The Ramp superimposing circuit 2 generates the second reference voltage Vref2, in which a positive-sloped Ramp component (ΔVref) is superimposed with the first reference voltage Vref1, by supplying the Ramp current signal Iramp, which is generated by the ramp generator 3, to a MOSFET 205 side of the resistor 208 and also by extracting the Ramp current signal Iramp from a MOSFET 207 side of the resistor 208.

The circuit configuration of FIG. 2 is one example, and the Ramp superimposing circuit 2 may have any configuration which can overlap a ramp signal (Ramp current signal Iramp), which is generated by the ramp generator 3, with the first reference voltage Vref1.

Returning to FIG. 1, the feedback comparator 1 compares the feedback voltage Vfb with the second reference voltage Vref2, and then outputs a ON_TRG signal as an effective signal to a Trg terminal of the on-timer 4 if the feedback voltage Vfb is lower than the second reference voltage Vref2.

The feed forward circuit 5 generates and outputs a feed forward current signal Ifw1, which is intended to maintain a substantially constant switching frequency even if setting of the input voltage Vin or the output voltage Vout is changed, to a FW terminal of the on-timer 4.

The feed forward circuit 5 generates and outputs a feed forward current signal Ifw2, which is intended to change a slope of the Ramp current signal Iramp, to the ramp generator 3 when setting of the input voltage Vin or the output voltage Vout is changed.

Figure 3:
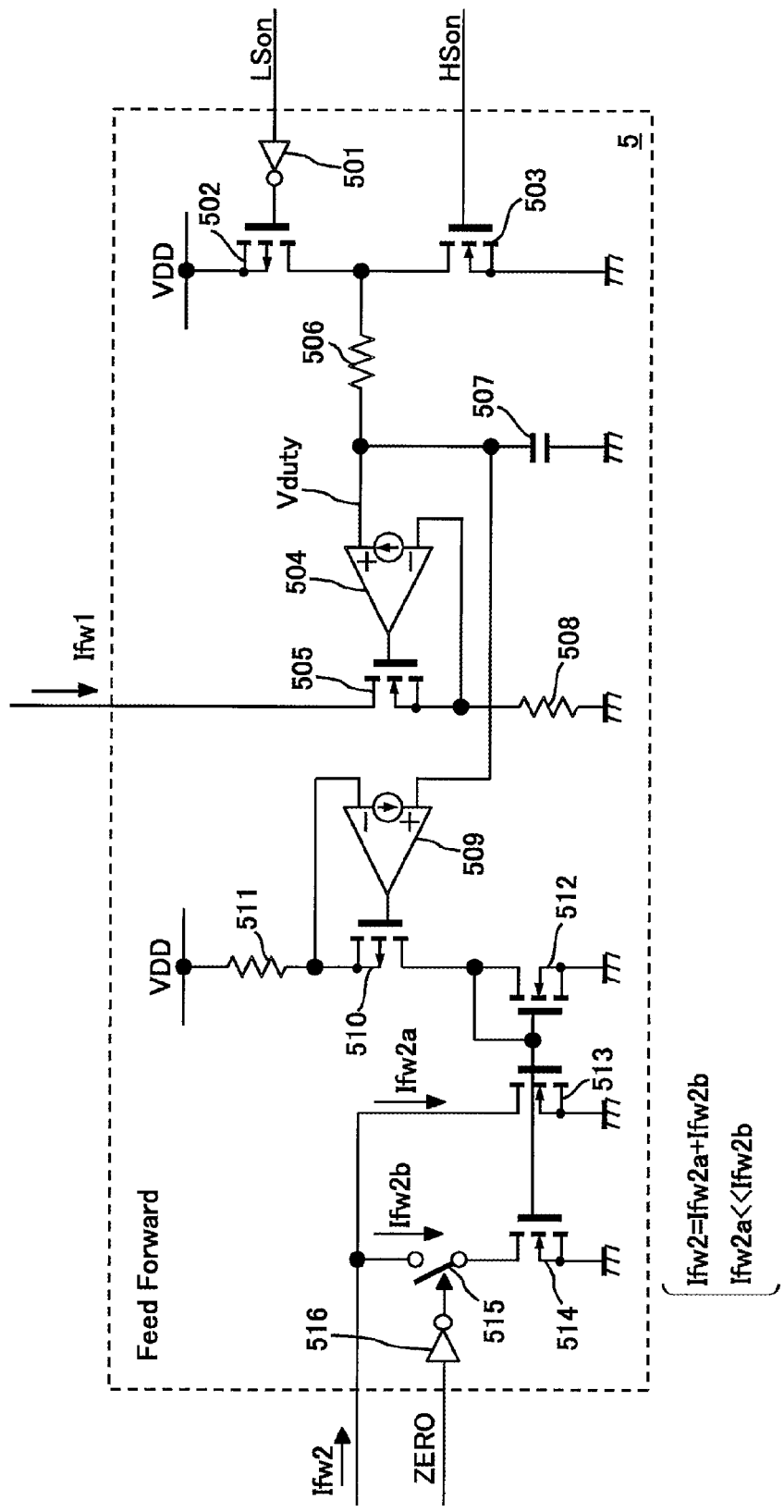
FIG. 3 is a view showing an example of a circuit configuration of a feed forward circuit 5.

FIG. 3 is a view showing an example of a circuit configuration of the feed forward circuit 5.

The feed forward circuit 5 includes a PchMOSFET 502 and an NchMOSFET 503, which are connected in series between a power source VDD and the ground. To a gate of the PchMOSFET 502, the driving signal LSon is inputted via an inverter 501. To a gate of the NchMOSFET 503, the driving signal HSon is inputted.

Additionally, the feed forward circuit 5 includes an operational amplifier 504, a resistor 506 connected at one end thereof to a connection point between the PchMOSFET 503 and the NchMOSFET 503 and at the other end to an non-inverted input terminal of the operational amplifier 504, a capacitor 507 connected between the ground and a connection point between the other end of the resistor 506 and the non-inverted input terminal of the operational amplifier 504, an NchMOSFET 505 connected to an output of the operational amplifier 504, and a resistor 508 connected between the NchMOSFET 505 and the ground. The inverted input terminal of the operational amplifier 504 is connected to a connection point between the NchMOSFET 505 and the resistor 508.

The feed forward circuit 5 shown in FIG. 3 turns alternately on and off the PchMOSFET 502 and the NchMOSFET 503 in response to the driving signal HSon and the driving signal LSon, thereby charging-and-discharging the capacitor 507 through the resistor 506.

The resistor 506 and the capacitor 507 configure a low-pass filter, of which a cut-off frequency is sufficiently lower than a switching frequency of the high-side MOSFET 8 and the low-side MOSFET 10. Accordingly, a voltage signal Vduty, which become substantially direct current and is changed in a decreasing direction as a ratio between a period during which the driving signal HSon is High and a period during which the driving signal LSon is High is decreased (as a voltage difference between the input voltage Vin and the output voltage Vout is reduced), is generated in the capacitor 507.

The operational amplifier 504, the NchMOSFET 505 and the resistor 508 configure a voltage-current conversion circuit. According to this voltage-current conversion circuit, the feed forward current signal Ifw1 changed in response to the voltage signal Vduty is generated and outputted to the FW terminal of the on-timer 4.

The feed forward circuit 5 further includes a second voltage-current conversion circuit configured by an operational amplifier 509, a PchMOSFET 510 and a resistor 511; two current mirror circuits, which are respectively configured by an NchMOSFET 512 and an NchMOSFET 513, and of an NchMOSFET 514; a switch 515; and an inverter 516.

To a drain terminal of the NchMOSFET 514, the switch 515 is connected. The switch 515 is controlled to be turned on and off by an output signal of the inverter 516, and the zero-cross detection signal ZERO from the zero-cross detection circuit 17 is inputted to the inverter 516.

The inverter 516 turns off the switch 515 while the zero-cross detection signal ZERO is being High, and turns on the switch while 515 the zero-cross detection signal ZERO is being Low.

A voltage signal Vduty generated in the capacitor 507 is converted to a current signal, which is changed in a decreasing direction as the voltage signal Vduty becomes higher, by the second voltage-current conversion circuit.

This current signal is outputted as a current signal Ifw2a to the ramp generator 3 through the current mirror circuit configured by the NchMOSFET 512 and the NchMOSFET 513.

Also, in a state where the switch 515 is on, the current signal is outputted as a current signal Ifw2b to the ramp generator 3 through the current mirror circuit configured by the NchMOSFET 512 and the NchMOSFET 514.

Thus, in the state where the switch 515 is on, a current signal obtained by adding the current signal Ifw2a and the current signal Ifw2b is outputted as the feed forward current signal Ifw2 to the ramp generator 3. On the other hand, in a state where the switch 515 is off, the current Ifw2a is outputted as the feed forward current signal Ifw2 to the ramp generator 3.

The current mirror circuit is designed such that the current signal Ifw2b is sufficiently larger than the current signal Ifw2a.

In this way, the feed forward circuit 5 serves as a single output unit for outputting a signal (feed forward current signal Ifw1 and feed forward current signal Ifw1) according to a ratio between a period, during which the high-side MOSFET 8 is turned on, and a period, during which the low-side MOSFET 10 is turned on.

When receiving the ON_TRG signal, the on-timer 4 switches a Ton signal, which is outputted from a terminal TM, from Low to High. The Ton signal is outputted to the drive logic 6.

After switching the Ton signal to High, the on-timer 4 switches the Ton signal from High to Low at a timing depending on a magnitude of the feed forward current signal Ifw1 outputted from the feed forward circuit 5.

Figure 4:
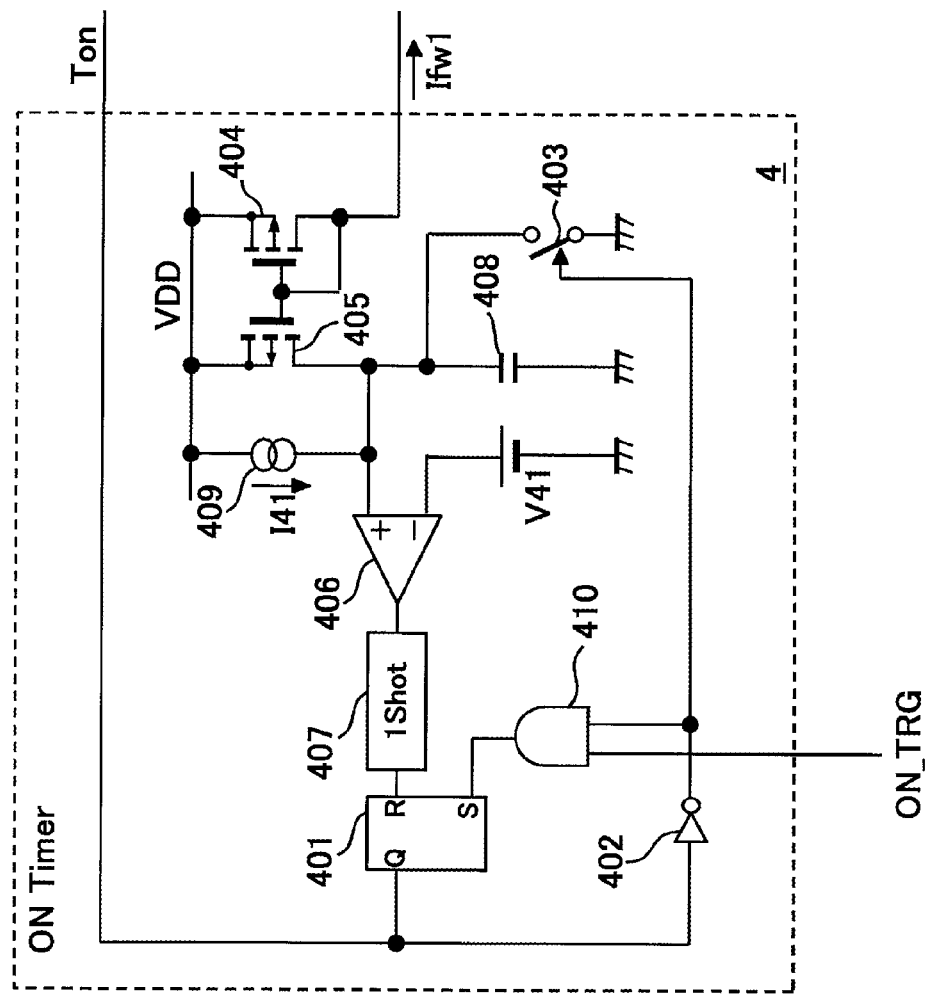
FIG. 4 is a view showing an example of a circuit configuration of an on-timer 4.

FIG. 4 is a view showing one circuit configuration example of the on-timer 4.

The on-timer 4 includes an SR flip-flop 401, an inverter 402 to which the Ton signal outputted from the SR flip-flop 401 is inputted, an AND circuit 410 to which the ON_TRG signal and an output signal of the inverter 402 are inputted, a switch 403 controlled on and off by the inverter 402, a 1-Shot circuit 407, a comparator 406, a constant current source 409, a MOSFET 404 to which the feed forward current signal Ifw1 is inputted, a MOSFET 405 through which a current proportional to a current flowing in the MOSFET 404 is flowed, and a capacitor 408 connected in series to the MOSFET 405.

An output of the 1-Shot circuit 407 is connected to a reset terminal R of the SR flip-flop 401, and an output of the AND circuit 410 is connected to a set terminal S of the SR flip-flop 401.

To the 1-Shot circuit 407, an output of the comparator 406 is connected.

The constant current source 409 and the capacitor 408 are connected to a non-inverted input terminal of the comparator 406, and a power source for supplying a reference voltage V41 is connected to an inverted input terminal of the comparator 406.

The on-timer 4 shown in FIG. 4 causes the SR flip-flop 401 to become a set state in response to the ON_TRG signal from the feedback comparator 1 during a period, during which the switch 403 is turned on, thereby outputting the Ton signal to the drive logic 6.

When the Ton signal is switched from Low to High, the switch 403 is turned from on to off via the inverter 402, and then charging of the capacitor 408 is started. A charging current of the capacitor 408 is determined by the sum of the feed forward current signal Ifw1 from the feed forward circuit 5 and a current signal I41 flowing in the constant current source 409.

Accordingly, in a condition where a voltage difference between the input voltage Vin and the output voltage Vout is small and an on-duty width of the high-side MOSFET 8 is wide (a ratio of an on-period of the low-side MOSFET 10 to an on-period the high-side MOSFET 8 is small), the charging current of the capacitor 408 is controlled to become smaller.

In contrast, in a condition where the voltage difference between the input voltage Vin and the output voltage Vout is large, the charging current of the capacitor 408 is controlled to become larger.

When a potential of both ends of the capacitor 408 is larger than the reference voltage V41, the output of the comparator 406 is switched from Low to High. In response to such a High output, the 1-Shot circuit 407 supplies a reset signal to the SR flip-flop 401 during a predetermined period of time. Thus, the Ton signal is switched from High to Low.

In this way, as the voltage difference between the input voltage Vin and the output voltage Vout is decreased, the on-timer 4 delays a High output of the comparator 406, thereby controlling a period, during which the Ton signal is High, to be lengthened.

The drive logic 6 sets the driving signal HSon to High during a period, during which the Ton signal from the on-timer 4 is High. The drive logic 6 sets the driving signal LSon to High during a regeneration-period of the current IL of the inductor 11, after switching the driving signal HSon from High to Low.

Then, the drive logic 6 switches the driving signal LSon from High to Low at a timing at which the zero-cross detection signal ZERO becomes High, thereby preventing an excessive backflow of the inductor current IL.

In this way, the drive logic 6 sets the driving signal HSon to High at a timing, at which the ON_TRG signal is switched to High and thus the Ton signal is switched to High, i.e., at a timing synchronized with the ON_TRG signal, thereby turning the high-side MOSFET 8 from off to on. The on-timer 4 and the drive logic 6 serve as a driving signal generation unit for generating the driving signal HSon.

Figure 5:
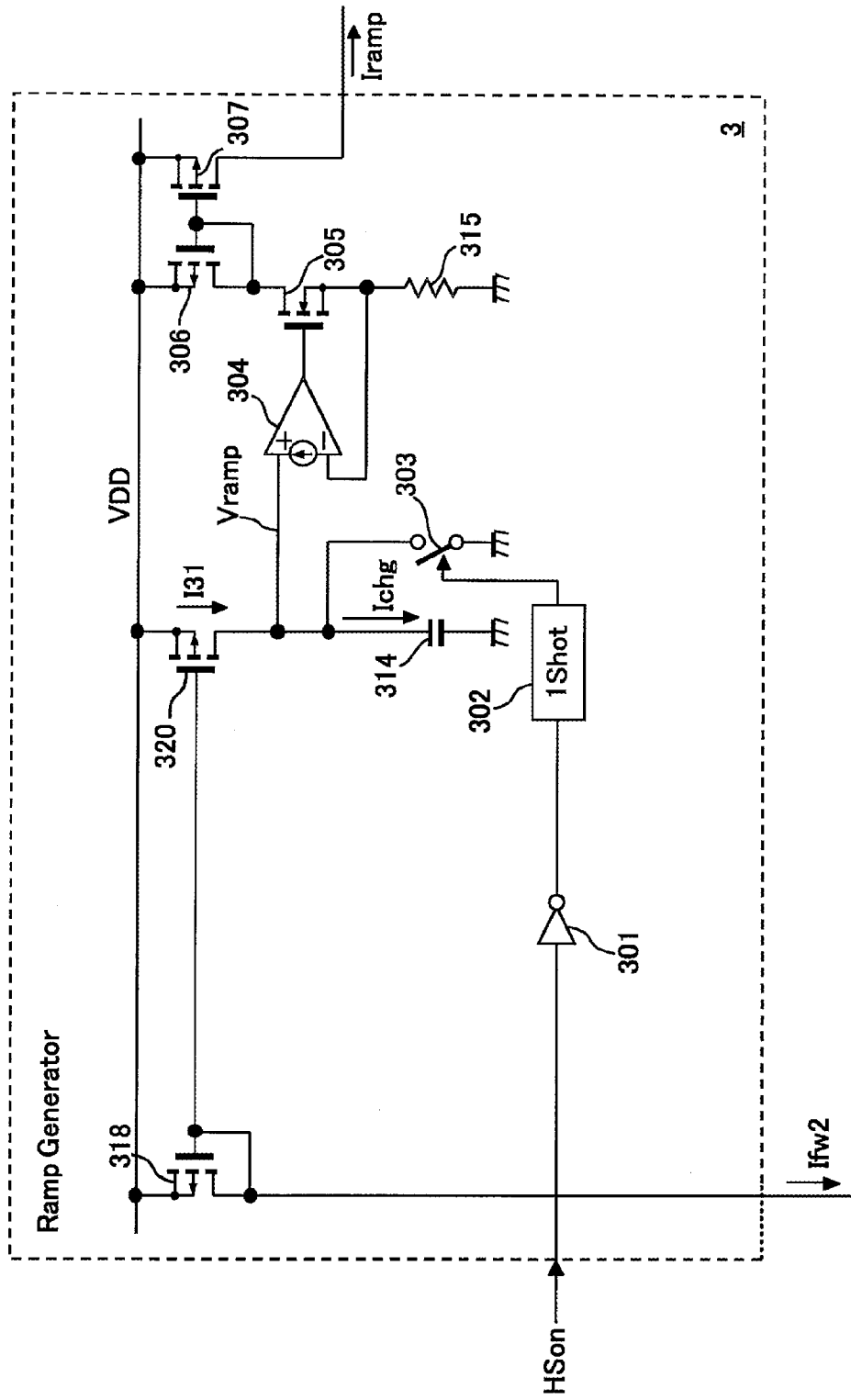
FIG. 5 is a view showing an example of a circuit configuration of a ramp generator 3.

FIG. 5 is a view showing an example of a circuit configuration of the ramp generator 3.

The ramp generator 3 shown in FIG. 5 includes a voltage-current conversion circuit configured by an operational amplifier 304, an NchMOSFET 305, a resistor 315, a PchMOSFET 306 and a PchMOSFET 307; a current mirror circuit configured by a PchMOSFET 318 and a PchMOSFET 320; a capacitor 314 connected in series to the PchMOSFET 320; and a charging-and-discharging circuit configured by a switch 303, a 1-Shot circuit 302 and a inverter 301.

In the charging-and-discharging unit, in response to that the driving signal HSon is switched from High to Low, the 1-Shot circuit 302 turns on the switch 303 through the inverter 301 during a predetermined period of time, thereby discharging charges of the capacitor 314. Then, after a predetermined period of time determined in the 1-Shot circuit 302 is elapsed, 1-Shot circuit 302 turns off the switch 303 and thus starts charging of the capacitor 314 with a current I31 supplied form the PchMOSFET 320, thereby generating the Ramp voltage signal Vramp.

In this way, the charging-and-discharging unit is configured to start discharging of the capacitor 314 at a time point, at which the high-side MOSFET 8 is turned from on to off in response to the driving signal HSon, and then to start charging of the capacitor 314 until the high-side MOSFET 8 is turned on.

Meanwhile, the current signal I31 is a current corresponding to the feed forward current signal Ifw2, and a magnitude of the feed forward current signal Ifw2 is controlled by the feed forward circuit 5. Thus, the feed forward circuit 5 serves as a first charging current control unit for controlling a charging current when the charging-and-discharging unit charges the capacitor 314.

The voltage-current conversion circuit configured by the operational amplifier 304, the NchMOSFET 305, the resistor 315, the PchMOSFET 306 and the PchMOSFET 307 outputs the Ramp current signal Iramp depending on the Ramp voltage signal Vramp to the Ramp superimposing circuit 2.

By the configuration as described above, the ramp generator 3 is configured to raise the Ramp current signal Iramp from the time point, at which the high-side MOSFET 8 has been turned from on to off, until the high-side MOSFET 8 is turned on.

The ramp generator 3 and the ramp superimposing circuit 2 serve as a reference voltage generation unit for generating the second reference voltage Vref2.

Operations of the switching power-supply device configured as described above will be described.

On condition that the output current Iout is constant, energy is supplied from the input voltage Vin to the output capacitor 12 and the load circuit 13 through the inductor 11 during a period, during which the high-side MOSFET 8 is turned on, thereby slightly increasing the output voltage Vout. If the high-side MOSFET 8 is turned off, the low-side MOSFET 10 is turned on.

During a period, during which the high-side MOSFET 8 is turned off, the output capacitor 12 is discharged by the output current Iout, and thus the output voltage Vout is slightly decreased. Accordingly, a ripple voltage similar to that in the output voltage Vout is also generated in the feedback voltage Vfb.

If the high-side MOSFET 8 is turned from on to off, the switch 303 of the ramp generator 3 is turned on so that the Ramp current signal Iramp is reset to a ground level, and after the predetermined period of time determined in the 1-Shot circuit 302 is elapsed, the switch 303 is turned off and thus the Ramp current signal Iramp starts rising. Thus, the second reference voltage Vref2 becomes higher than the reference voltage Vref1.

The feedback comparator 1 compares the feedback voltage Vfb with the positive-sloped second reference voltage Vref2 and then outputs the ON_TRG signal when the feedback voltage Vfb is lower than the second reference voltage Vref2.

If the ON_TRG signal is outputted, the high-side MOSFET 8 is turned on during a predetermined period of time determined depending on the feed forward current signal Ifw1. At this time, energy is transferred to the output capacitor 12 through the inductor 11, and thus the output voltage Vout is again increased.

By repeating these operations, the switching power-supply device is stably operated at a substantially constant switching frequency.

Figure 6:
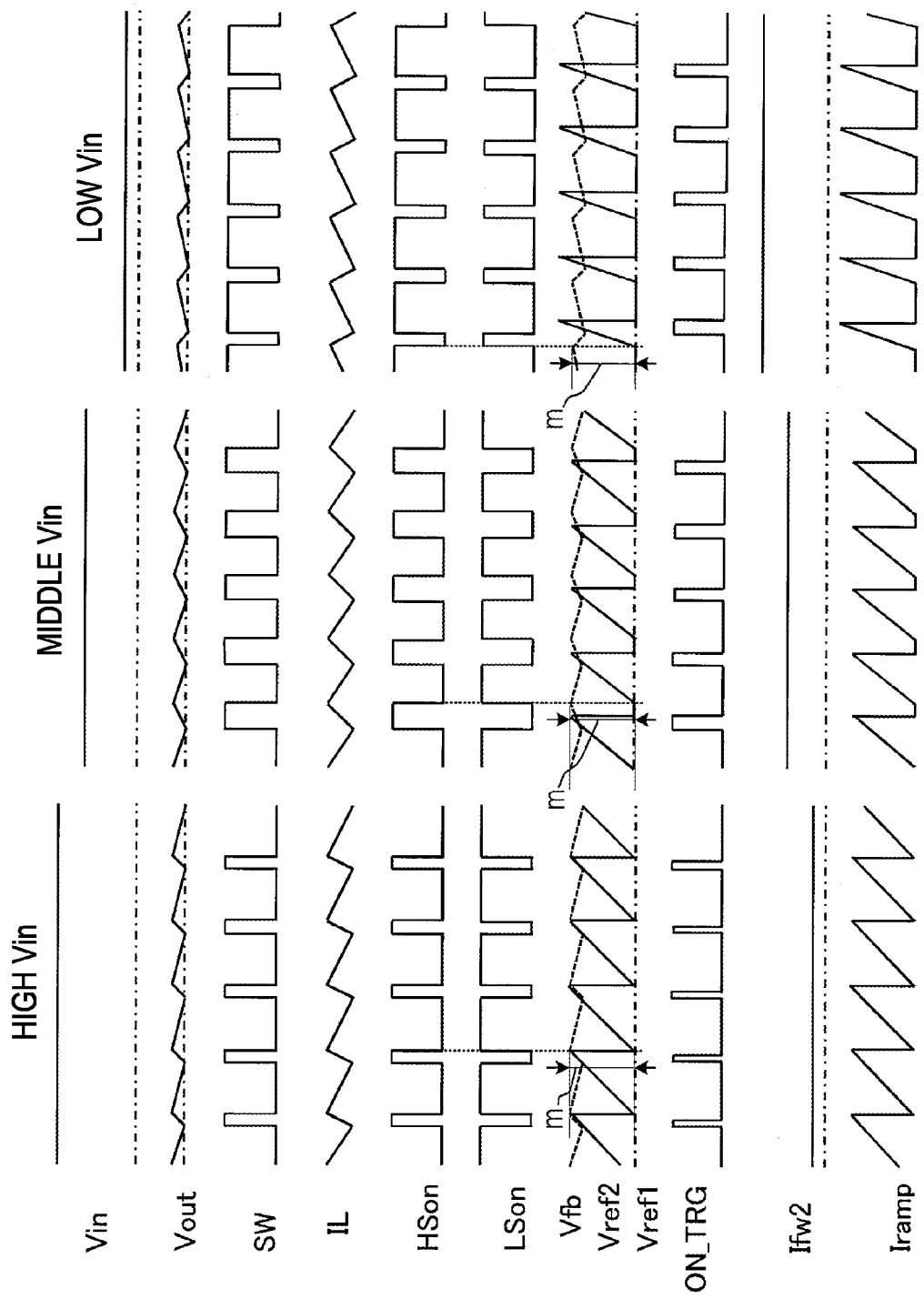
FIG. 6 is a timing chart showing operations of the switching power-supply device shown in FIG. 1 when a difference between an input voltage Vin and an output voltage Vout is changed.

Next, operations of the switching power-supply device shown in FIG. 1 when a difference between the input voltage Vin and the output voltage Vout is changed will be described. FIG. 6 is a timing chart showing operations of the switching power-supply device shown in FIG. 1 when the difference between the input voltage Vin and the output voltage Vout is changed.

If the input voltage Vin is decreased so that the difference between the input voltage Vin and the output voltage Vout becomes narrow, an on-duty width of the high-side MOSFET 8 is widened as the feed forward current signal Ifw1 is reduced.

Meanwhile, if the difference between the input voltage Vin and the output voltage Vout becomes narrow, the feed forward current signal Ifw2 is increased. Accordingly, the slope of the Ramp current signal Iramp generated based on the feed forward current signal Ifw2 becomes steep.

Figure 7:
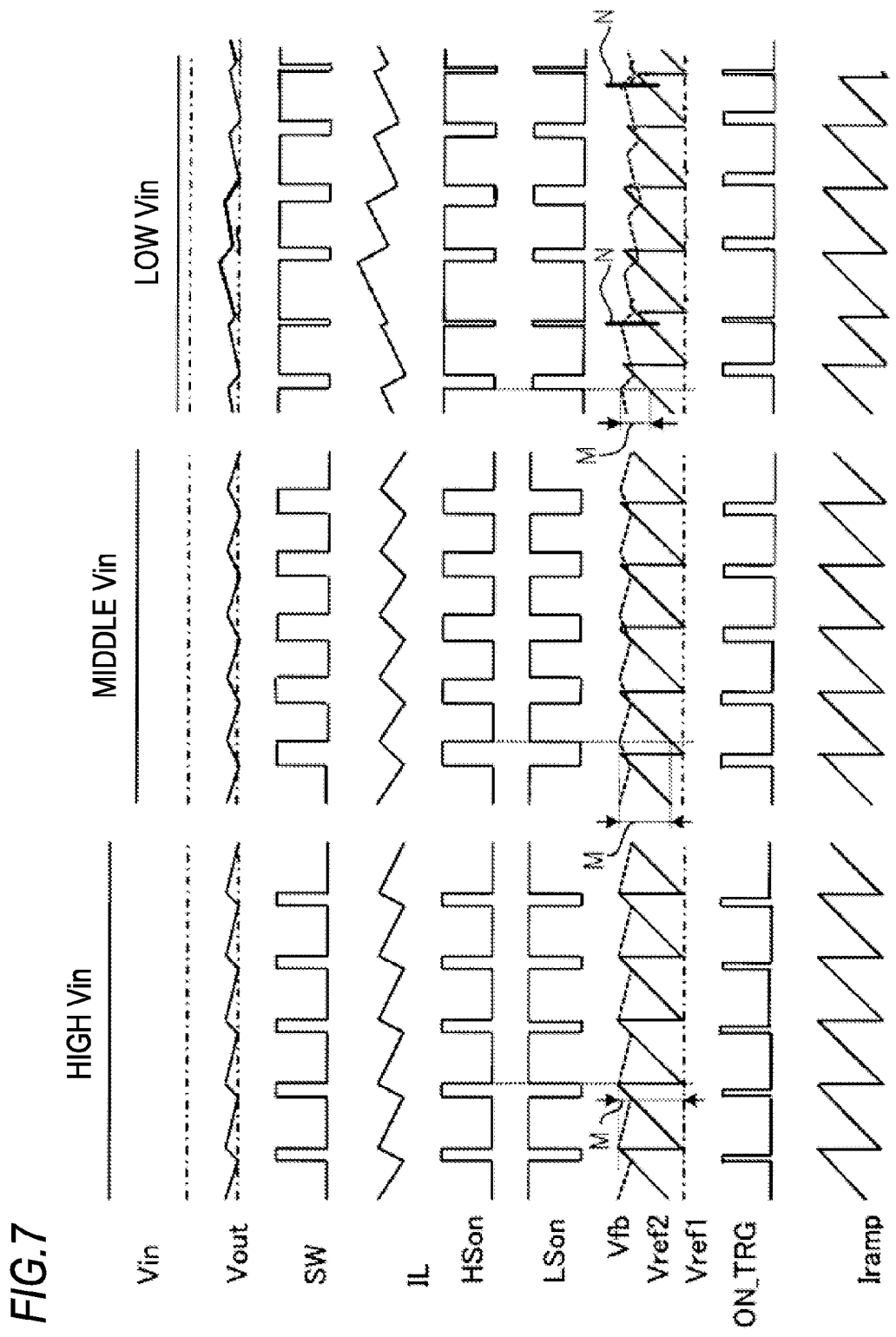
FIG. 7 is a timing chart showing operations of a switching power-supply device of a first reference example corresponding to those of FIG. 6.

FIG. 7 is a timing chart showing operations of a switching power-supply device of a first reference example corresponding to those of FIG. 6.

The switching power-supply device of the first reference example has a configuration in which the inverter 301 of the ramp generator 3 of the switching power-supply device shown in FIG. 1 is replaced with a delay circuit and thus the capacitor 314 is discharged to start rising of the Ramp current signal Iramp after the high-side MOSFET 8 has been turned on and then a predetermined period of time has been elapsed. Also, the switching power-supply device of the first reference example has a configuration in which the PchMOSFET 318 of the ramp generator 3 in the switching power-supply device shown in FIG. 1 is omitted and thus the charging current for the capacitor 314 is kept constant.

As shown in FIG. 7, according to the switching power-supply device of the first reference example, a difference M between the feedback voltage Vfb and the second reference voltage Vref2 at a time point, at which the high-side MOSFET 8 is turned from on to off, is decreased as the difference between the input voltage Vin and the output voltage Vout is decreased.

Accordingly, for example, when Vin is low, if the feedback voltage Vfb at the time point, at which the high-side MOSFET 8 is turned from on to off, has a noise N superimposed therewith, an amount of the feedback voltage Vfb reduced due to the noise N excesses the voltage difference M. Therefore, immediately after the high-side MOSFET 8 has been turned from on to off, the ON_TRG signal is switched to High and then the high-side MOSFET 8 is turned on immediately, thereby causing switching operation to become unstable.

In contrast, according to the switching power-supply device shown in FIG. 1, as shown in FIG. 6, the difference M between the feedback voltage Vfb and the second reference voltage Vref2 at the time point, at which the high-side MOSFET 8 is turned from on to off, is kept constant regardless of the difference between the input voltage Vin and the output voltage Vout.

Thus, even if the feedback voltage Vfb at the time point, at which the high-side MOSFET 8 is turned from on to off, has the noise N superimposed therewith, the switching power-supply device is hardly subject to an influence from the noise and thus can perform a stable switching operation.

Also, according to the switching power-supply device shown in FIG. 1, the slope of the Ramp current signal Iramp becomes steep as the difference between the input voltage Vin and the output voltage Vout is decreased, and therefore, even if rising of the Ramp current signal Iramp is started at the timing, at which the high-side MOSFET 8 is turned off, the switching frequency and the output voltage Vout can be kept constant.

Figure 8:
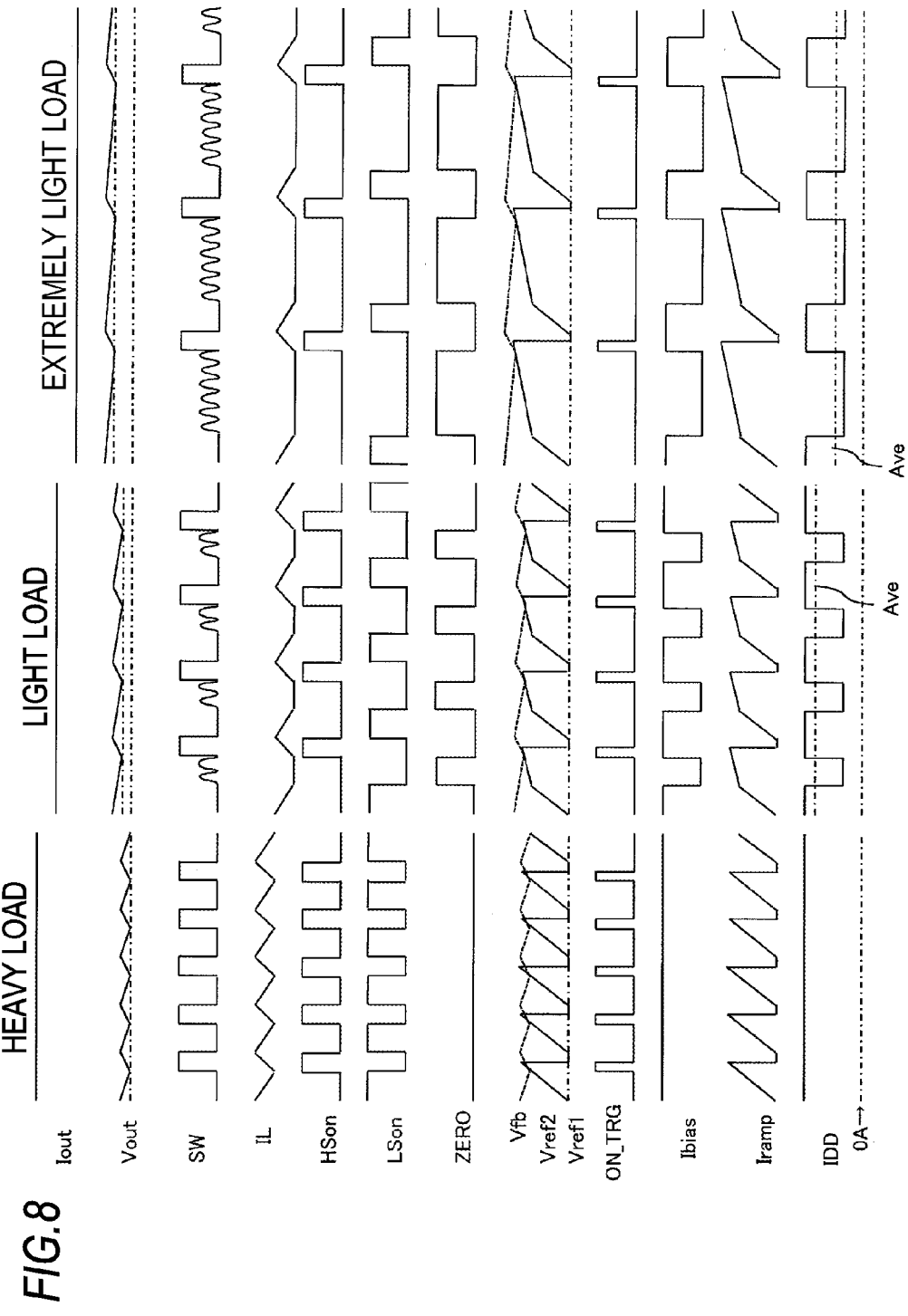
FIG. 8 is a timing chart showing operations of the switching power-supply device shown in FIG. 1 when an output current Iout is shifted from a heavy load to a light load.

Next, operations of the switching power-supply device shown in FIG. 1 when the output current Iout is shifted from a heavy load to a light load will be described. FIG. 8 is a timing chart showing operations of the switching power-supply device shown in FIG. 1 when the output current Iout is shifted from a heavy load to a light load.

If the output current Iout is shifted from a heavy load to a light load, the inductor current IL of the inductor 11 becomes a discontinuous state (state where regeneration of the inductor 11 is completed during a period from a rise to the next rise of HSon).

In this state, the zero-cross detection signal ZERO outputted from the zero-cross detection circuit 17 is switched from Low and High. Thus, by the drive logic 6, the low-side MOSFET 10 is turned off and also the switch 21 is turned off. Also, in this state, the switch 515 of the feed forward circuit 5 is turned off.

When the switch 21 is turned off, operating of the drive regulation 18 is stopped. Thus, a loss of a circuit current is reduced to suppress an electric power from being uselessly consumed, thereby improving a light load efficiency.

When the switch 515 is turned off, the feed forward current signal Ifw2 supplied to the ramp generator 3 is decreased and therefore the charging current Ichg for the capacitor 314 generated based on the feed forward current signal Ifw2 is also decreased. Thus, a slope of the second reference voltage Vref2 superimposed with the Ramp current signal Iramp becomes gentle. Also, a circuit current loss occurred in the ramp generator 3 is reduced, and correspondingly the light load efficiency is improved.

Then, if charges of the output capacitor 12 are slowly discharged by the output current Iout, the output voltage Vout is reduced. When the feedback voltage Vfb becomes lower than the second reference voltage Vref2, the feedback comparator 1 outputs the ON_TRG signal so that the high-side MOSFET 8 is again turned on and also the zero-cross detection signal ZERO is switched from High to Low, thereby turning on the switch 21 and the switch 515.

Thus, the drive regulator 18 resumes operating, and the charging current Icfg for the capacitor 314 in the ramp generator 3 is increased. As a result, the slope of the second reference voltage Vref2 superimposed with the Ramp current signal Iramp becomes steep.

By repeating operations as described above, as the output current Iout is reduced and the switching frequency is reduced, an average current value of the circuit current IDD is decreased, thereby reducing an electric power loss and improving the light load efficiency. Also, in a state where the switching frequency has been reduced, the slope of the Ramp current signal Iramp generated in the ramp generator 3 becomes gentle from when regeneration of the inductor 11 has been completed and to when the ON_TRG signal is outputted. Thus, increasing of the output voltage can be prevented.

Figure 9:
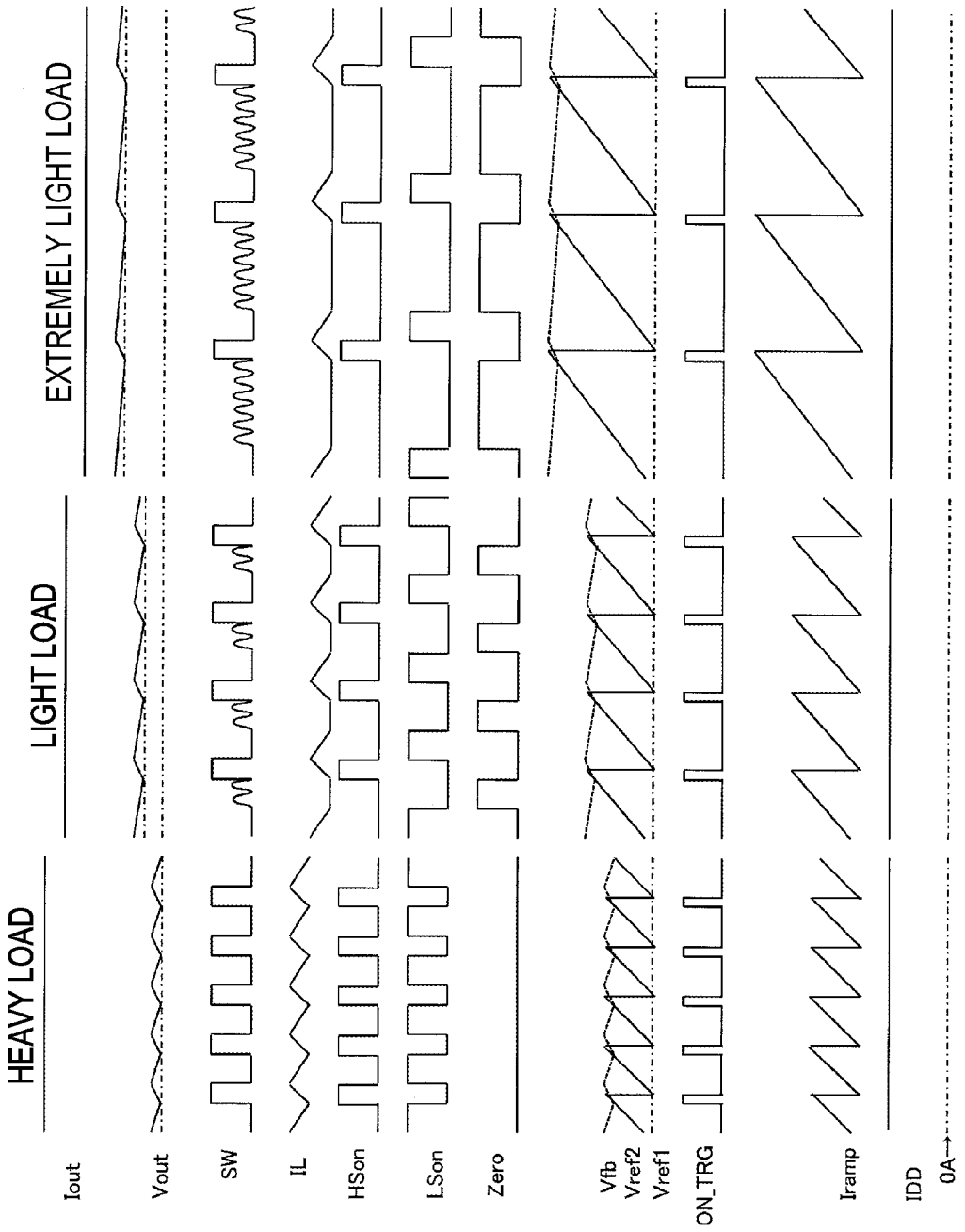
FIG. 9 is a timing chart showing operations of a switching power-supply device of a second reference example corresponding to those of FIG. 8.

FIG. 9 is a timing chart showing operations of a switching power-supply device of a second reference example corresponding to those of FIG. 8.

The switching power-supply device of the second reference example has a configuration in which the inverter 301 of the ramp generator 3 of the switching power-supply device shown in FIG. 1 is replaced with a delay circuit and thus the capacitor 314 is discharged to start rising of the Ramp current signal Iramp after the high-side MOSFET 8 has been turned on and then a predetermined period of time has been elapsed. Also, the switching power-supply device of the second reference example has a configuration in which the PchMOSFET 318 of the ramp generator 3 in the switching power-supply device shown in FIG. 1 is omitted and thus the charging current for the capacitor 314 is kept constant. In addition, the switching power-supply device of the second reference example has a configuration in which the switch 21 in the switching power-supply device shown in FIG. 1 is always turned on.

In the switching power-supply device of the second reference example, a circuit current of the switching power-supply shown in "IDD" of FIG. 9 is kept constant regardless of a magnitude of an output current Iout. In contrast, according to the switching power-supply device of FIG. 1, an average value Ave of a circuit current IDD as shown in "IDD" of FIG. 8 can be drastically decreased, thereby enhancing efficiency during a light load.

Also, in the switching power-supply device of the second reference example, as shown in FIG. 9, the slope of the second reference voltage Vref2 is always kept constant. If the output current is shifted to a light load, the switching frequency is reduced, and therefore, as shown in FIG. 9, a peak voltage of the second reference voltage Vref2 is increased. As a result, the output voltage Vout is also increased.

In contrast, according to the switching power-supply device of FIG. 1, the slope of the second reference voltage Vref2 is controlled to be gentle from when regeneration of the inductor 11 has been completed and to when the high-side MOSFET 8 is turned on. Accordingly, even if the output current is shifted to a light load and the switching frequency is reduced, as shown in FIG. 8, a peak voltage of the second reference voltage Vref2 is not so increased. As a result, a difference in the output voltage Vout between during a heavy load and during a light load can become smaller.

Figure 10:
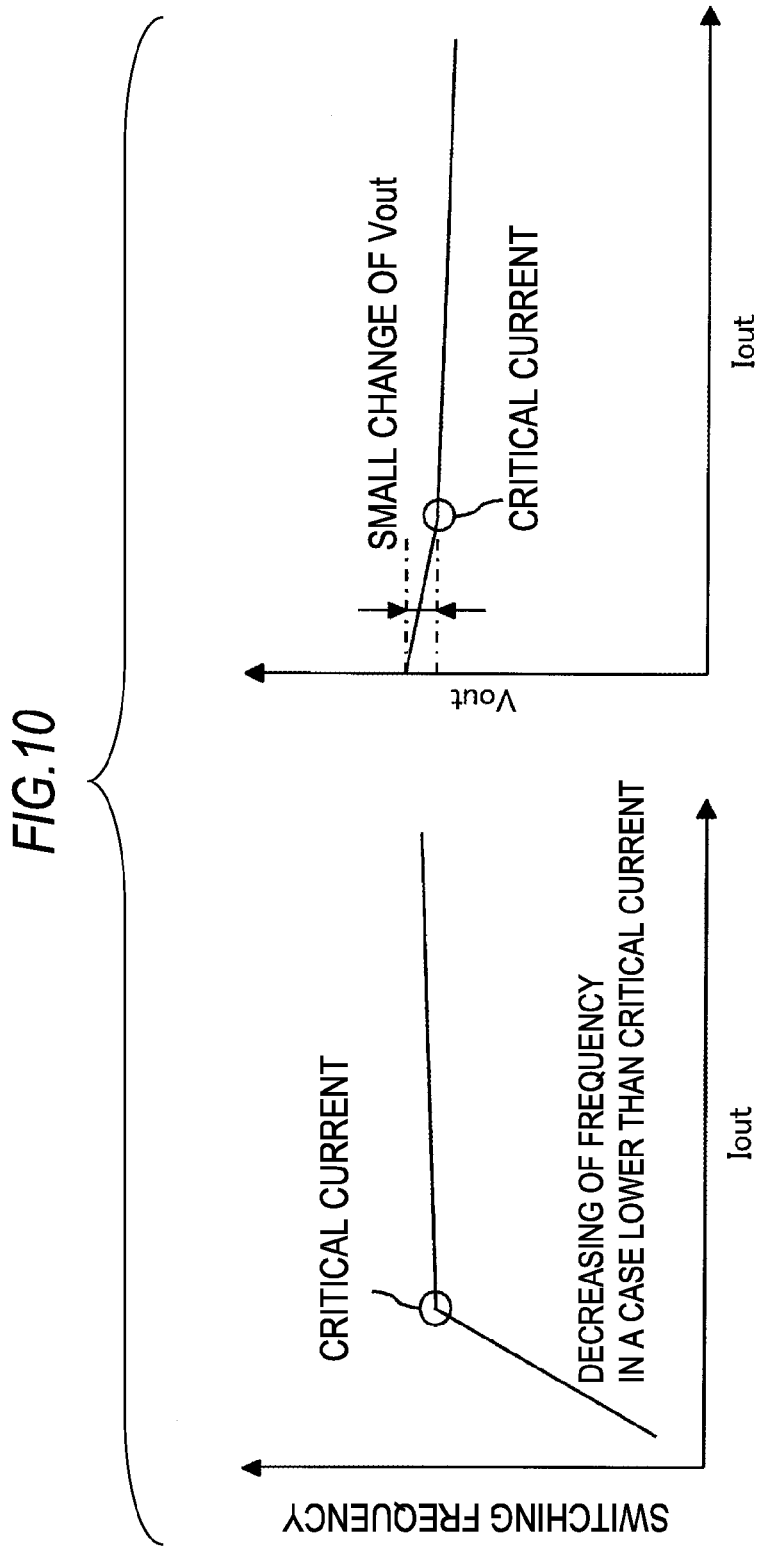
FIG. 10 is a view showing relationships of an output current Iout and a switching frequency and of the output current Iout and an output voltage Vout in the switching power-supply device shown in FIG. 1.
Figure 11:
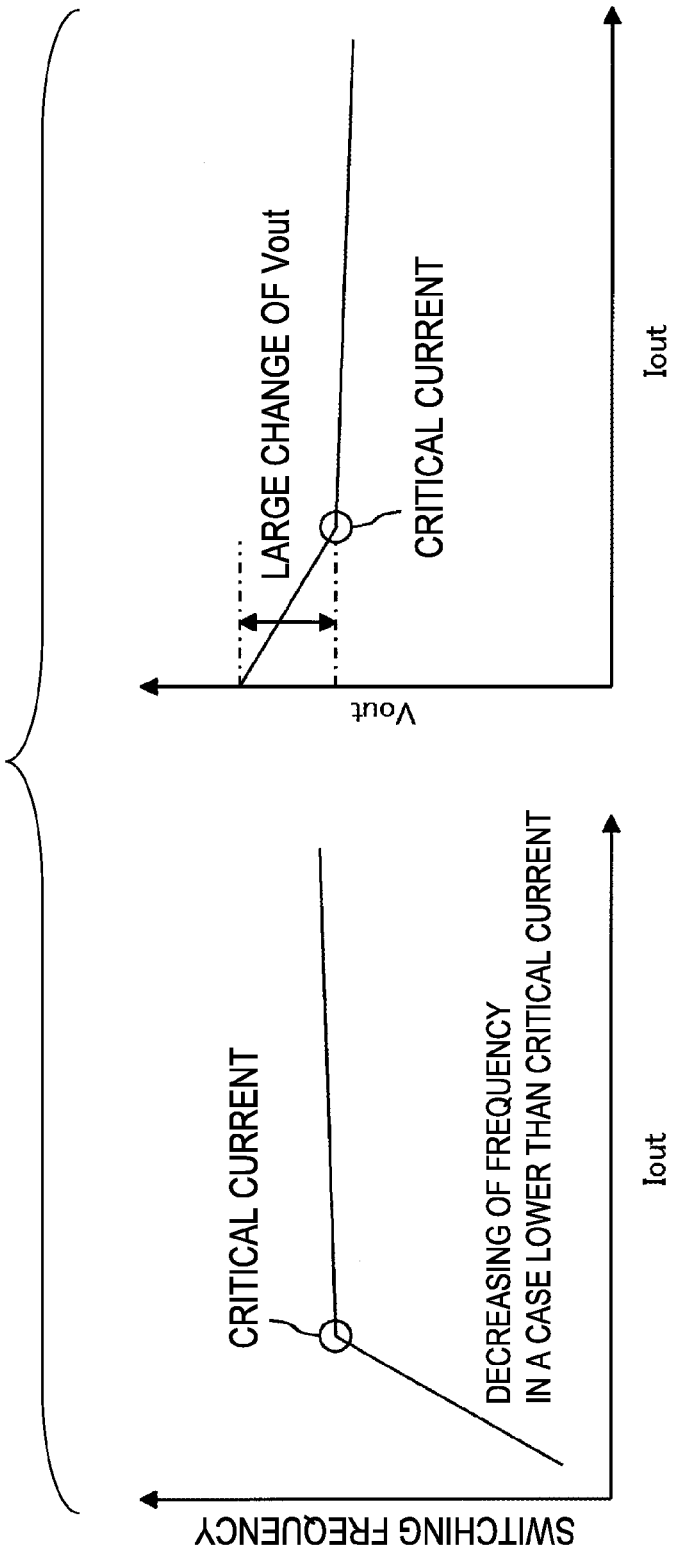
FIG. 11 is a view showing relationships of an output current Iout and a switching frequency and of the output current Iout and an output voltage Vout in the switching power-supply device of the second reference example.

FIG. 10 is a view showing relationships of the output current Iout and the switching frequency and of the output current Iout and the output voltage Vout in the switching power-supply device shown in FIG. 1. FIG. 11 is a view showing relationships of the output current Iout and the switching frequency and of the output current Iout and the output voltage Vout in the switching power-supply device of the second reference example.

The relationship of the output current Iout and the switching frequency is identical between the switching power-supply device of the second reference example and the switching power-supply device of FIG. 1. By comparison between FIG. 10 and FIG. 11, it can be found that the slope of the output voltage Vout in the switching power-supply device of FIG. 1 is gentle even if the output current Iout becomes lower than a critical value and thus the switching frequency is reduced.

Figure 12:
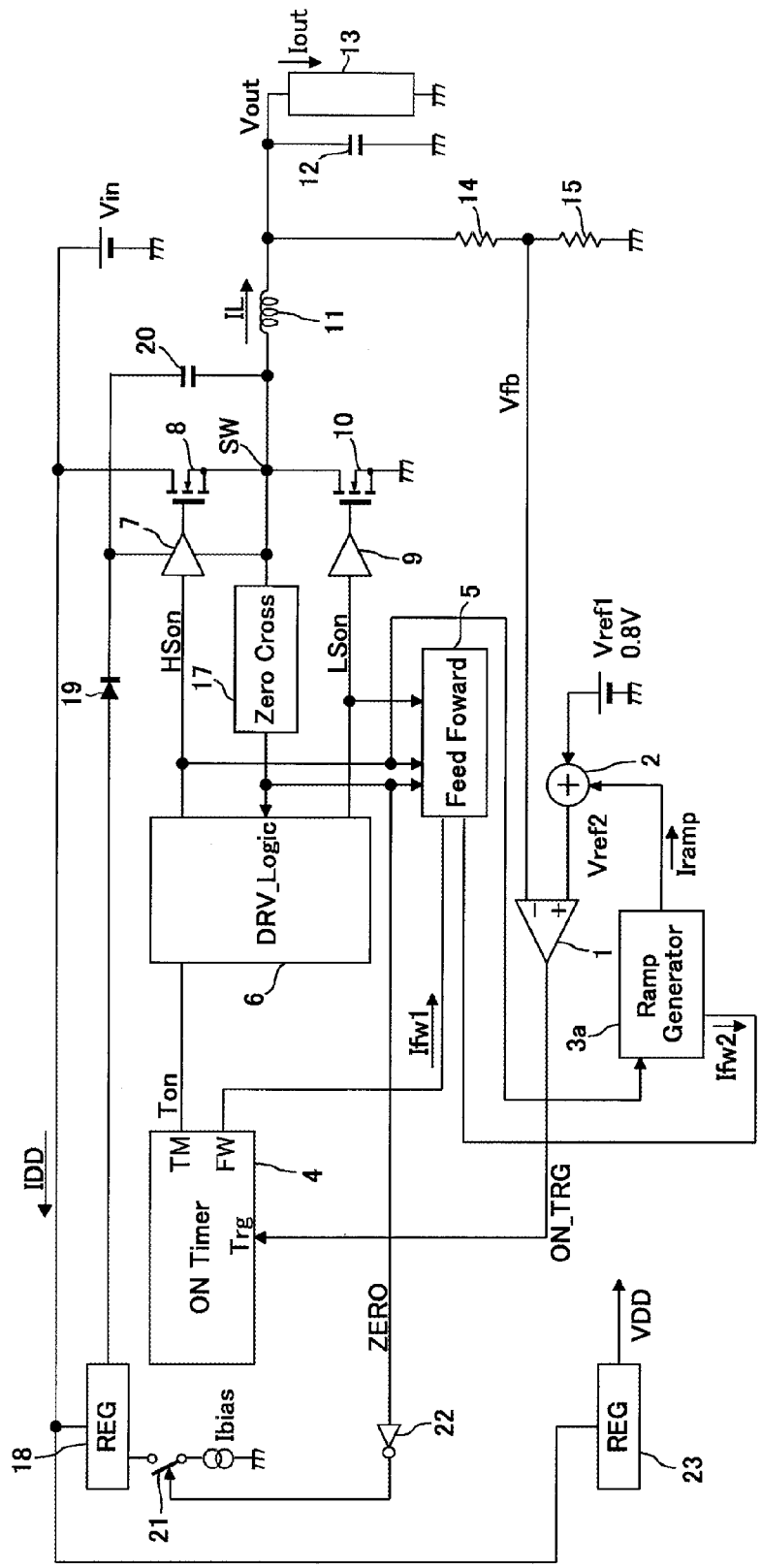
FIG. 12 is a view showing a variant of the switching power-supply device shown in FIG. 1.

FIG. 12 is a view showing a variant of the switching power-supply device shown in FIG. 1. A switching power-supply device shown in FIG. 12 has the same configuration as that of the switching power-supply device shown in FIG. 1, except that the ramp generator 3 is replaced with a ramp generator 5a.

Figure 13:
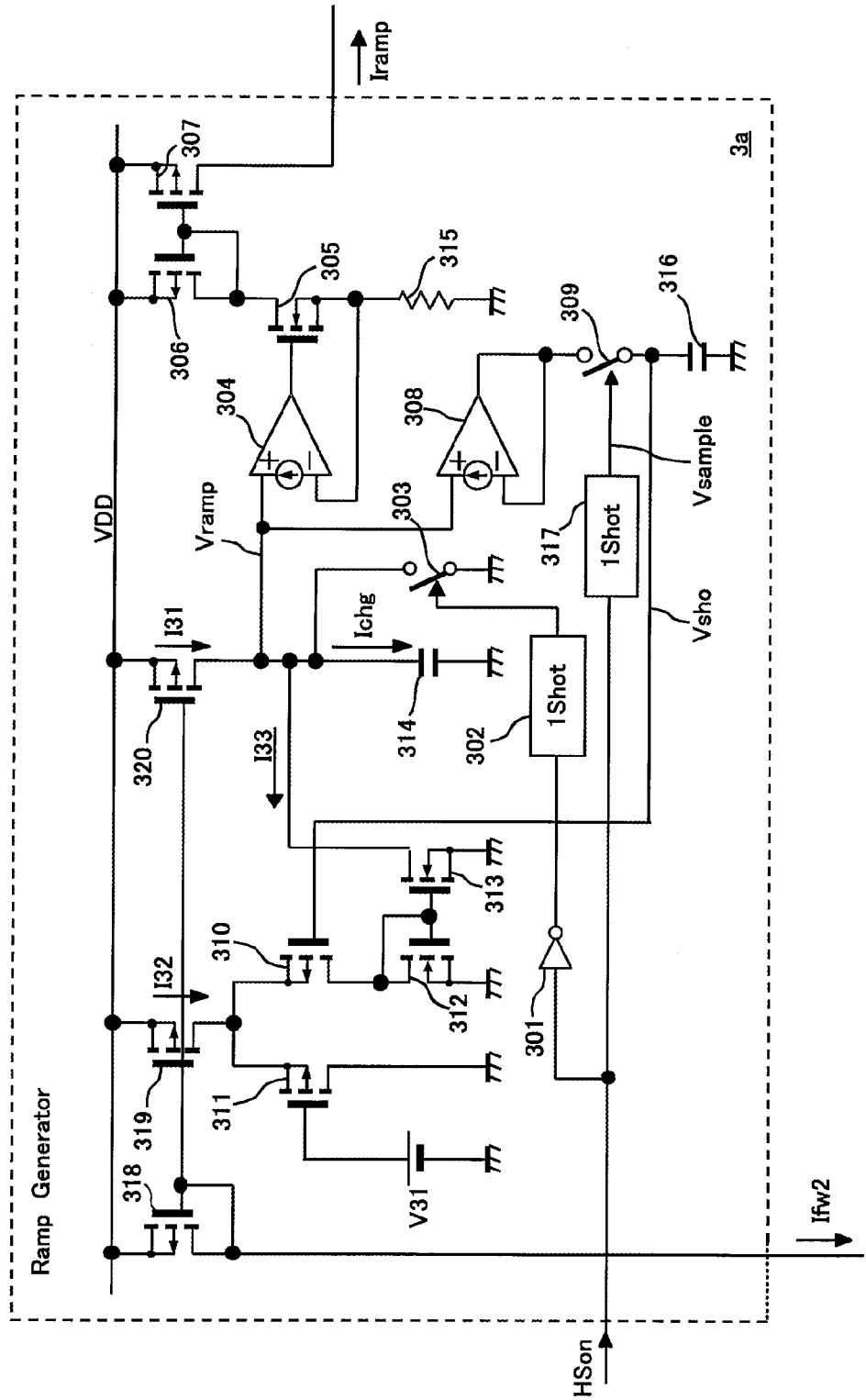

FIG. 13 is a view showing an example of a circuit configuration of the ramp generator 3a.

The ramp generator 3a shown in FIG. 13 has a configuration in which a sample hold circuit, which is configured by an operational amplifier 308, a switch 309, a capacitor 316 and a 1-Shot circuit 317, and an operational transconductance amplifier, which is configured by a PchMOSFET 311, a PchMOSFET 310, an NchMOSFET 312, an NchMOSFET 313, a constant current source 319 and a power source for supplying a reference voltage V31 is added to the ramp generator 3.

The PchMOSFET 319 serves as a constant current source and supplies a current signal 132 to the PchMOSFET 311 and the PchMOSFET 310.

To the capacitor 314, the voltage-current conversion circuit, the sample hold circuit and the operational transconductance amplifier are connected.

In the ramp generator 3a, in response to that the driving signal HSon is switched from High to Low, the 1-Shot circuit 302 turns on the switch 303, thereby discharging charges of the capacitor 314.

In the ramp generator 3a, the 1-Shot circuit turns off the switch 303 after a predetermined period of time determined in the 1-Shot circuit 302 is elapsed, and thus starts charging of the capacitor 314 with a current signal, which is obtained by subtracting a current signal 133, as described below, from a current signal 131 supplied form the PchMOSFET 320, thereby generating the Ramp voltage signal Vramp.

The voltage-current conversion circuit configured by the operational amplifier 304, the NchMOSFET 305, the resistor 315, the PchMOSFET 306 and the PchMOSFET 307 outputs the Ramp current signal Iramp depending on the Ramp voltage signal Vramp to the Ramp superimposing circuit 2.

On the other hand, the Ramp voltage signal Vramp is inputted to the sample hold circuit configured by the operational amplifier 308, the switch 309, the capacitor 316 and the 1-Shot circuit 317. The 1-Shot circuit 317 turns on the switch 309 during a predetermined period of time at a timing, at which the driving signal HSon is switched from Low to High.

Thus, a voltage signal Vsho obtained by sample-holding the Ramp voltage signal Vrmap at the timing, at which the driving signal HSon is switched from Low to High is generated.

The sample hold circuit serves as a voltage holding unit for holding a voltage of the capacitor 314 at a timing, at which the high-side MOSFET 8 is turned from off to on in response to the driving signal HSon.

The operational transconductance amplifier configured by the PchMOSFET 311, the PchMOSFET 310, the NchMOSFET 312, the NchMOSFET 313, the constant current source 319 and the power source for supplying the reference voltage V31 compares the voltage signal Vsho with the reference voltage V31 and generates the current signal 133, which is changed in an increasing direction as the voltage signal Vsho is decreased relative to the reference voltage V31.

A current output terminal of the operational transconductance amplifier is connected to a connection point between the PchMOSFET 320 and the capacitor 314. Accordingly, as the current signal 133 is increased, the charging current Ichg of the capacitor 314 is decreased so that a slope of the Ramp voltage signal Vramp becomes gentle, and therefore a slope of the Ramp current signal Iramp becomes gentle. As a result, the slope of the second reference voltage Vref2, which is an output signal of the Ramp superimposing circuit 2, becomes gentle.

In this way, the operational transconductance amplifier serves as a second charging current control unit for reducing the charging current Ichg as the voltage signal Vsho held by the voltage holding unit becomes smaller.

In the switching power-supply device shown in FIG. 12, operations thereof when the output voltage Vout is stable, operations thereof when input-and-output conditions (a ratio or difference between the input voltage Vin and the output voltage Vout) are changed, and operations thereof when a load of the output current Iout is changed are identical to those of the switching power-supply device shown in FIG. 1. In the following, operations of the switching power-supply device shown in FIG. 12 when the output current Iout is suddenly switched from a light load to a heavy load will be described.

Figure 14:
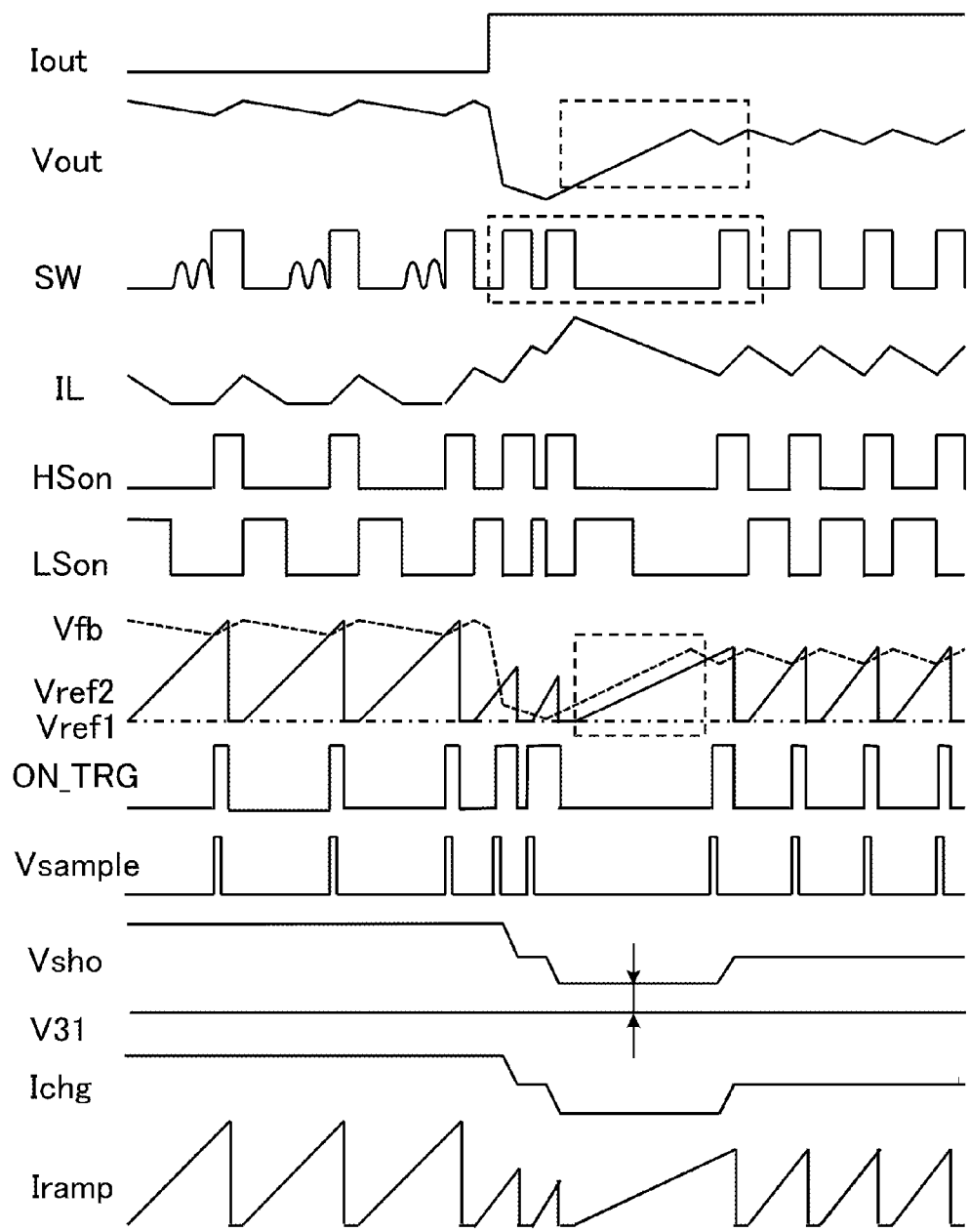
FIG. 14 is a timing chart showing operations of the switching power-supply device shown in FIG. 12 when an output current Iout thereof is suddenly switched from a light load to a heavy load.

FIG. 14 is a timing chart showing operations of the switching power-supply device shown in FIG. 12 when an output current Iout thereof is suddenly switched from a light load to a heavy load.

If the output current Iout is switched from the light load to the heavy load, the output voltage Vout is temporarily decreased due to delay of feedback control, and therefore the feedback voltage Vfb is also decreased. At this time, the feedback voltage Vfb is lower than the second voltage Vref2 at a timing earlier than a timing during a normal operation.

As a result, a timing, at which the ON_TRG signal is outputted, is earlier than a timing in which the output current Iout is constant, and thus the switching frequency is controlled to be increased temporarily. Accordingly, load response performance is improved.

In the ramp generator 3, in response to where the ON_TRG signal is outputted and the driving signal HSon for driving the high-side MOSFET 8 is switched from Low to High, the 1-Shot circuit 317 turns on the switch 309 during a predetermined period of time. Therefore, the voltage signal Vsho, which is a value of the Ramp voltage signal Vramp at a timing at which the high-side MOSFET 8 is turned on, is maintained in the capacitor 316.

Since a timing, at which the feedback voltage Vfb is lower than the second reference voltage Vref2, is earlier than that during a normal operation in which a load is constant, the voltage signal Vsho at this time has a lower value. In response to where the voltage signal Vsho has such a lower voltage value, the charging current Ichg for the capacitor 314 is decreased, and thus a slope of the second reference voltage Vref2 becomes gentler than that during a normal operation in which a load is constant.

If the second reference voltage Vref2 becomes gentler, the timing, at which the feedback voltage Vfb is lower than the second reference voltage Vref2, becomes later, and therefore a pause period of the high-side MOSFET 8 is increased. Accordingly, the output voltage Vout is slowly increased without overshooting. Thereafter, if the output voltage Vout is recovered to a predetermined voltage, a stable normal operation at a constant switching frequency is resumed.

According to a series of operations as described above, when the output current Iout is suddenly changed from the light load to the heavy load and the output voltage Vout is decreased, the high-side MOSFET 8 is immediately turned on to perform a high frequency oscillation operation, thereby realizing a high load response performance. Further, immediately after the high frequency oscillation, a pause period of the high-side MOSFET 8 is actively extended, thereby suppressing overshooting of the output voltage.

As described above, the switching power-supply device shown in FIG. 12 compares the voltage signal Vsho, which is held in the capacitor 316, with the reference voltage V31, thereby deciding that a generation cycle of a timing, at which due to a sudden load change, the output voltage Vout is decreased and the feedback voltage Vfb becomes lower than the second reference voltage Vref2, i.e., an output cycle of the ON_TRG signal has been shortened. In other words, a time period of the output cycle of the ON_TRG signal is decided by comparing the voltage signal Vsho, which corresponds to the output cycle of the ON_TRG signal, with the reference voltage V31.

In addition, the switching power-supply device shown in FIG. 12 decrease the charging current Ichg for the capacitor 314 as the voltage signal Vsho becomes smaller, so that the slope of the Ramp current signal Iramp becomes gentle. As the slope of the Ramp current signal Iramp becomes gentle, a period of time taken until the feedback voltage Vfb becomes lower than the second reference voltage Vref2 can be lengthened and the switching frequency of the high-side MOSFET 8 can be lowered at an earlier stage, thereby suppressing overshooting of the output voltage.

In a case where the output voltage Vout is decreased due to a sudden load change, if a period, during which the switching frequency of the high side MOSFET 8 is high, is continued so that the output voltage Vout is recovered to a predetermined voltage, the output voltage Vout continues to increase due to energy accumulated in the inductor 11 during such a period, even after the output voltage Vout is reached to the predetermined voltage. Accordingly, there is a risk in that a large overshoot occurs and in the worst case, the load circuit 13 is broken.

As a countermeasure against such an overshoot, a configuration, in which a phase advance capacitor is provided, can be also conceived, but in this configuration, the output capacitor 12 needs to have an increased size, thereby disturbing downsizing and cost reduction of a control board.

Figure 15:
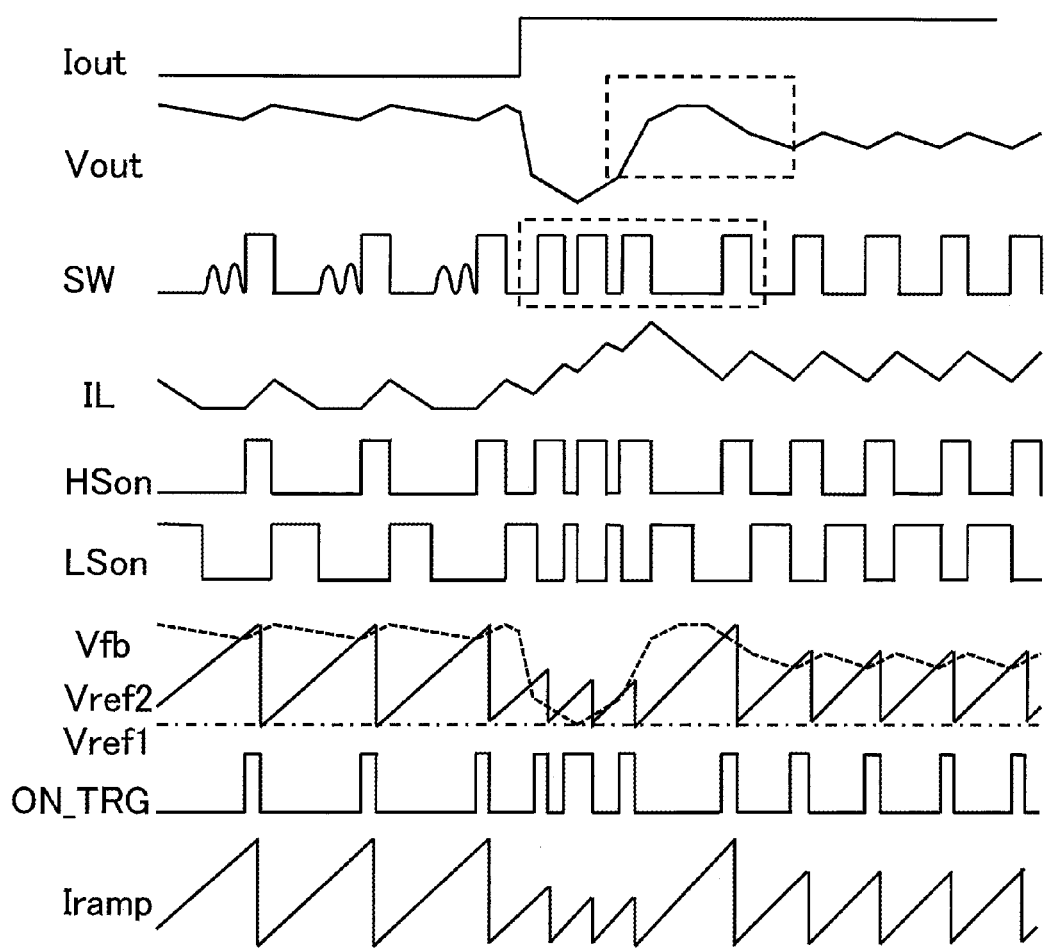
FIG. 15 is a timing chart showing operations of a switching power-supply device of a third reference example corresponding to those of FIG. 14.

FIG. 15 is a timing chart showing operations of a switching power-supply device of a third reference example corresponding to those of FIG. 14.

The switching power-supply device of the third reference example has a configuration in which the inverter 301 of the ramp generator 3 of the switching power-supply device shown in FIG. 1 is replaced with a delay circuit and thus the capacitor 314 is discharged to start rising of the Ramp current signal Iramp after the high-side MOSFET 8 has been turned on and then a predetermined period of time has been elapsed. Also, the switching power-supply device of the third reference example has a configuration in which the charging current for the capacitor 314 in the switching power-supply device shown in FIG. 1 is kept constant.

As shown in FIG. 15, in the switching power-supply device of the third reference example, if the output voltage Vout is decreased due to a load change, a state where the switching frequency of the high-side MOSFET 8 is high is lengthened, as compared to that in FIG. 12. Accordingly, overshoot occurs.

In contrast, according to the switching power-supply device shown in FIG. 12, as the output cycle of the ON_TRG signal is shortened, the slope of the Ramp current signal Iramp is controlled to become gentle, thereby preventing a large overshoot from being occurred without providing the phase advance capacitor. Accordingly, downsizing and cost reduction of the control board are possible.

Also, according to the switching power-supply shown in FIG. 12, the output cycle of the ON_TRG signal is temporarily shortened immediately after a load has been changed, thereby ensuring a load response performance.

In the switching power-supply device shown in FIG. 12, as the generation cycle of the ON_TRG signal is shortened, the slope of the Ramp current signal Iramp becomes gentle depending on the generation cycle. However, the slope of the Ramp current signal Iramp is not necessary to be linearly changed and thus may be changed in a stepwise manner.

For example, a first cycle may be set for the generation cycle of the ON_TRG signal, and when the generation cycle of the ON_TRG signal is shorter than the first cycle, the slope of the Ramp current signal Iramp may be set to a first value, whereas the generation cycle of the ON_TRG signal is equal to or longer than the first cycle, the slope of the Ramp current signal Iramp may be set to a second value larger than the first value. The first cycle may be a minimum value of the generation cycle of the ON_TRG signal, which can be set, for example, when a load is constant.

Also in the switching power-supply devices shown in FIG. 12, when a first state, where the generation cycle of the ON_TRG signal has a certain value, is changed to a second state, where the generation cycle of the ON_TRG signal has a value smaller than the certain value, the slope of the Ramp current signal Iramp is controlled to become gentler than a set value in the first state. The certain value corresponds to the first cycle.

Figure 16:
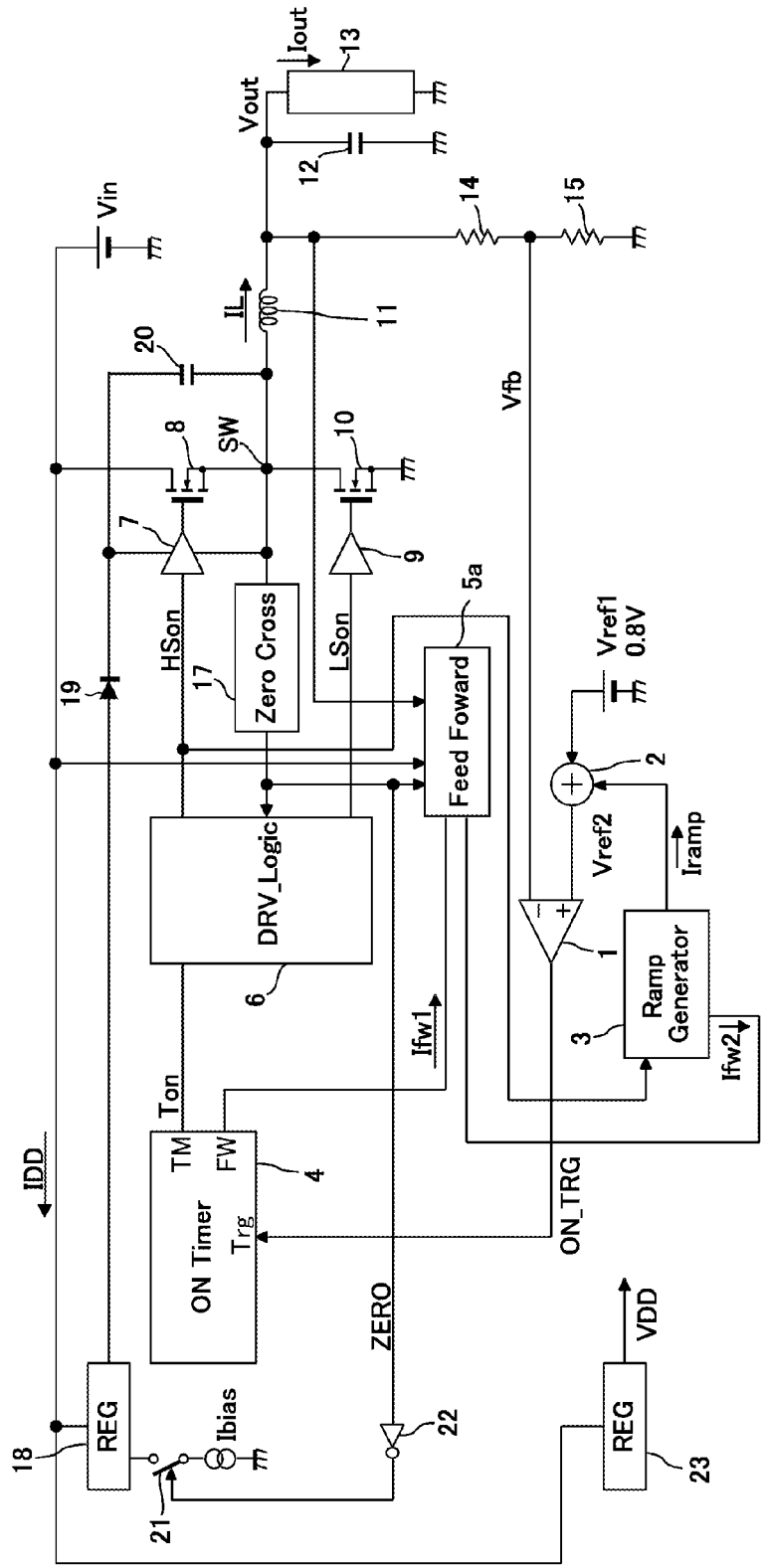
FIG. 16 is a view showing a variant of the switching power-supply device shown in FIG. 1.

FIG. 16 is a view showing a variant of the switching power-supply device shown in FIG. 1. A switching power-supply device shown in FIG. 16 has the same configuration as that of the switching power-supply device shown in FIG. 1, except that the feed forward circuit 5 is replaced with a feed forward circuit 5a.

The feed forward circuit 5a has the same function as that of the feed forward circuit 5 and is different therefrom only in a circuit configuration.

The feed forward circuit 5 described in FIG. 3 detects indirectly a voltage difference between the input voltage Vin and the output voltage Vout from a time ratio between the driving signal HSon and the driving signal LSon, thereby generating the feed forward current signals Ifw1 and Ifw2.

In contrast, the feed forward circuit 5a is configured to directly detect a voltage difference between the input voltage Vin and the output voltage Vout and then to generate a feed forward current signals Ifw1 and Ifw2 depending on the difference between the input voltage Vin and the output voltage Vout. The feed forward circuit 5a serves as a signal output unit for outputting a signal depending on the difference between the input voltage Vin and the output voltage Vout.

Figure 17:
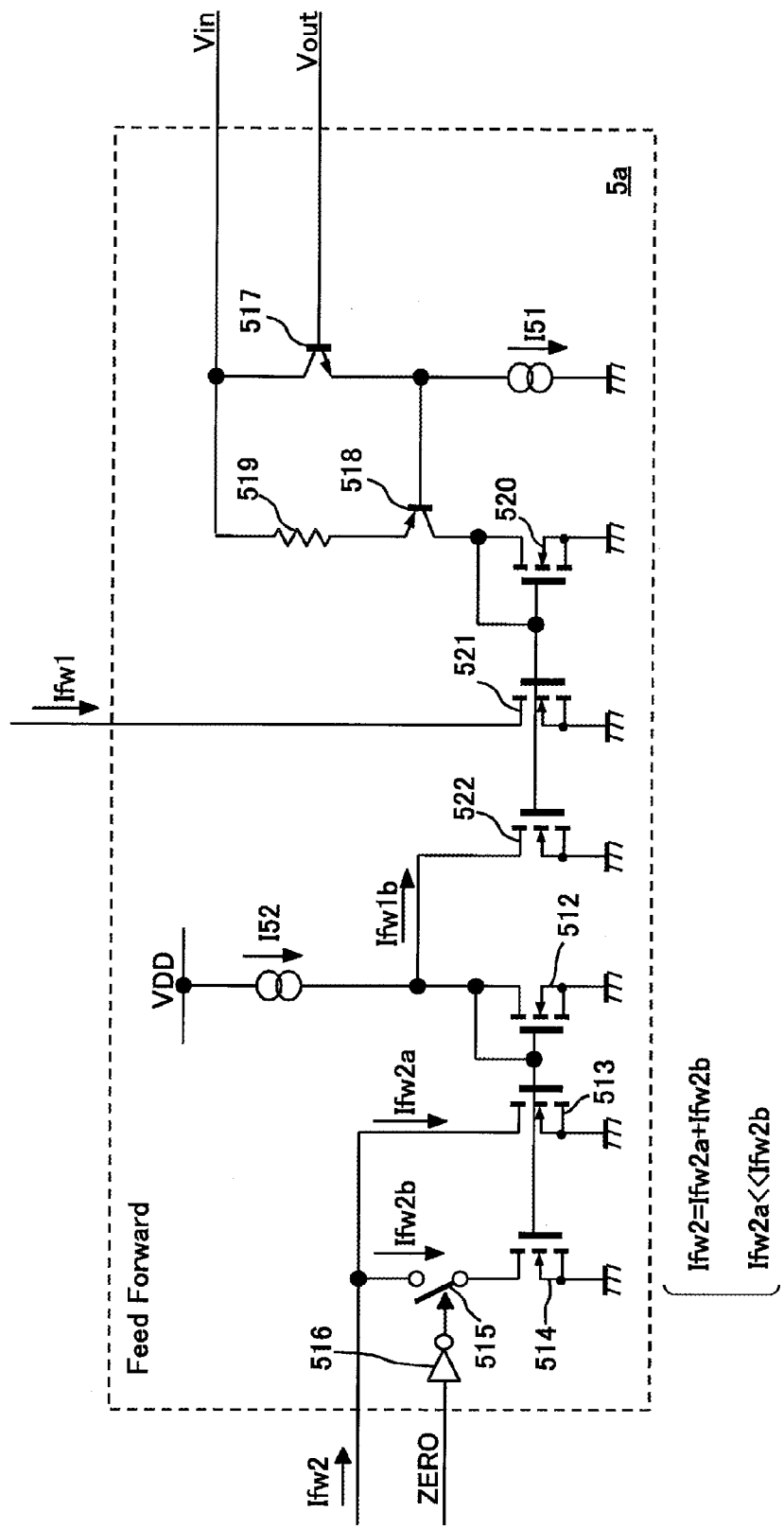

FIG. 17 is a view showing an example of a circuit configuration of the feed forward circuit 5a.

The feed forward circuit 5a has a configuration in which the resistor 511 and the MOSFET 510 in the feed forward circuit 5 of FIG. 3 are replaced with a constant current source for supplying a constant current signal 152, circuit elements, which are located on the right side more than the operational amplifier 509, are omitted and a new circuit is connected to a connection point between the MOSFET 512 and the constant current source for supplying the constant current signal 152.

This new circuit includes a voltage difference detection unit configured by an NPN transistor 517, a PNP transistor 518, a resistor 519 and a constant current source for supplying a constant current signal 151; a first current mirror circuit configured by an NchMOSFET 520 and an NchMOSFET 521; and a second current mirror circuit configured by the NchMOSFET 520 and an NchMOSFET 522.

The voltage difference detection unit detects a voltage difference between the input voltage Vin and the output voltage Vout and then current-converts the voltage difference in the resistor 519. The first current mirror circuit outputs, as the feed forward current Ifw1, the current-converted current to the on-timer 4.

On the other hand, the second current mirror circuit outputs, as a current signal Ifw2a, a current signal, which is obtained by subtracting a current signal Ifw1b proportional to the feed forward current signal Ifw1 from the constant current signal 152 and thus is decreased as the voltage difference between the input voltage Vin and the output voltage Vout is increased, to the ramp generator 3 through the current mirror circuit configured by the MOSFET 513 and the MOSFET 512.

Thus, the larger the voltage difference between the input voltage Vin and the output voltage Vout, the higher the feed forward current Ifw1 is, so that a timing, at which a voltage of the capacitor 408 of the on-timer 4 become higher than the reference voltage V41, is earlier, and therefore a period, during which the ON_TRG signal is High, is controlled to be shortened.

In addition, the larger the voltage difference between the input voltage Vin and the output voltage Vout, the lower the current signal Ifw2a is, so that the slope of the Ramp current signal Iramp is controlled to become gentle.

Like as in the switching power-supply device shown in FIG. 1, the feed forward circuit 5a can realize a substantially constant switching frequency even if setting of the input voltage Vin or the output voltage Vout (input/output condition) is changed and also achieve a cost reduction as the capacitor 507 shown in FIG. 3 having a large capacitance is not required.

Figure 18:
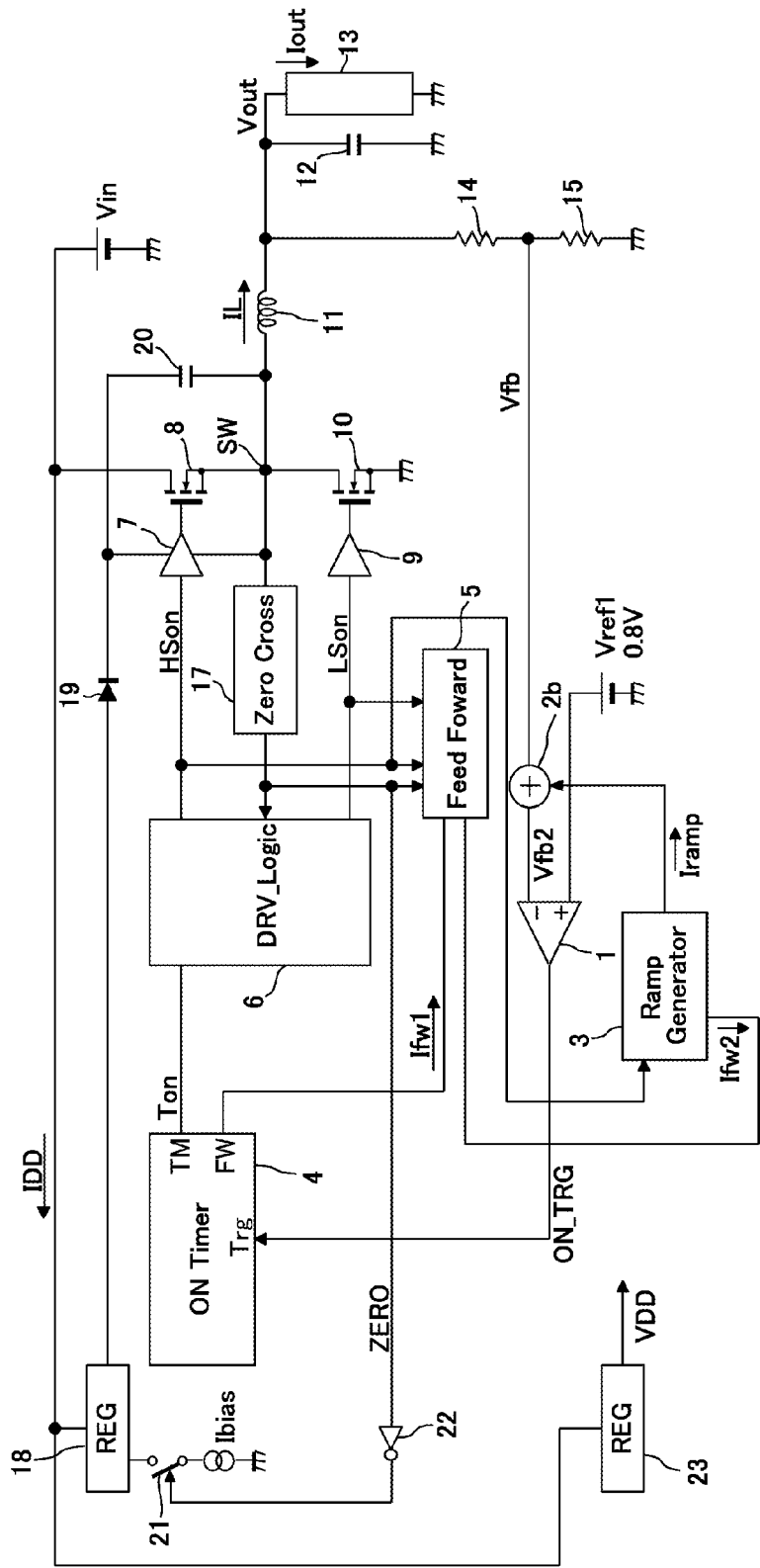
FIG. 18 is a view showing a variant of the switching power-supply device shown in FIG. 1.

FIG. 18 is a view showing a variant of the switching power-supply device shown in FIG. 1. In the switching power-supply device shown in FIG. 18, the Ramp superimposing circuit 2 is replaced with a Ramp superimposing circuit 2b.

Meanwhile, the switching power-supply device shown in FIG. 18 is different from that in FIG. 1, in that the Ramp superimposing circuit 2b is connected between the inverted input terminal of the feedback comparator 1 and the connection point between the feedback resistor 14 and the feedback resistor 15, and also the power source for supplying the first reference voltage Vref1 is connected to the non-inverted input terminal of the feedback comparator 1.

Figure 19:
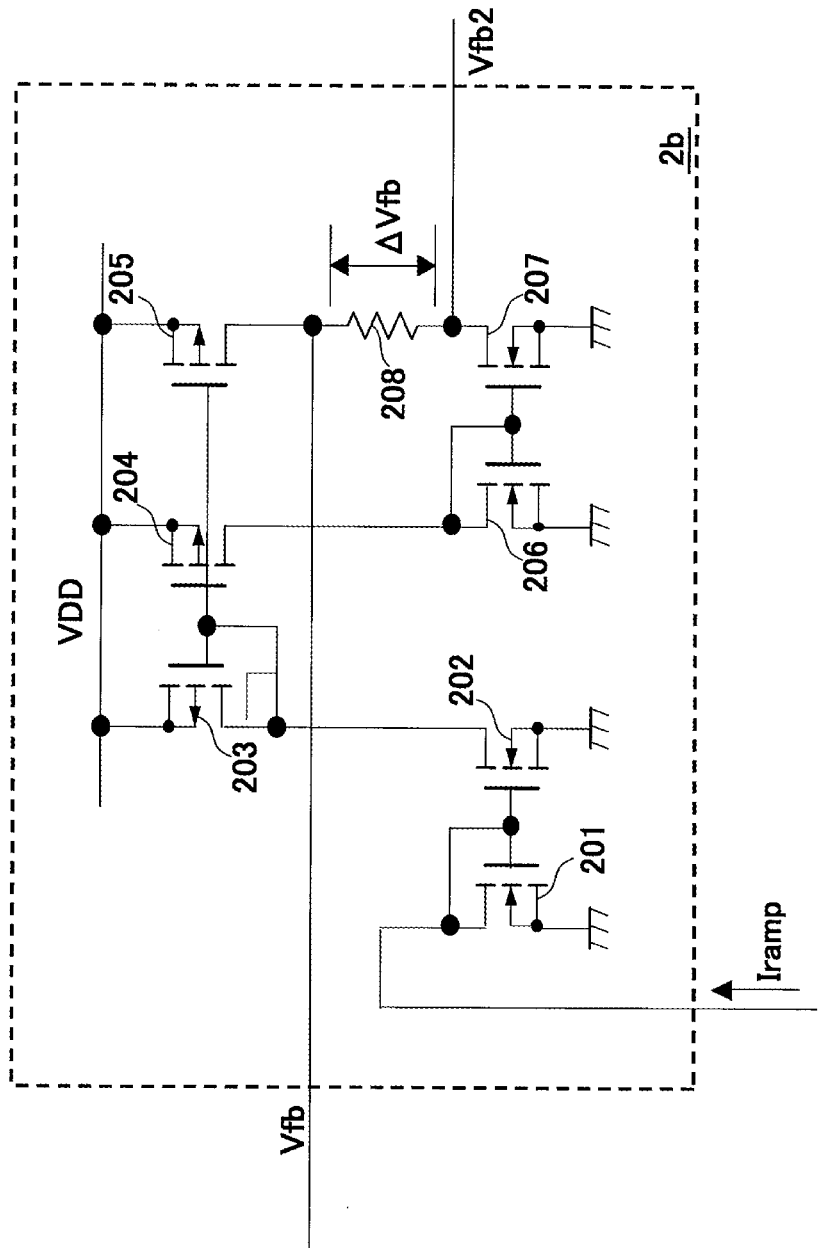
FIG. 19 is a view showing an example of a circuit configuration of a Ramp superimposing circuit 2b.

FIG. 19 is a view showing an example of a circuit configuration of the Ramp superimposing circuit 2b.

The Ramp superimposing circuit 2b shown in FIG. 19 has the same configuration as that of the Ramp superimposing circuit 2 shown in FIG. 2, except that the connection point between the feedback resistor 14 and the feedback resistor 15 is connected to a connection point between the resistor 208 and the MOSFET 205 and the inverted input terminal of the feedback comparator 1 is connected to a connection point between the resistor 208 and the MOSFET 207.

The Ramp superimposing circuit 2b generates a feedback voltage Vfb2, in which a negative-sloped Ramp component is superimposed with the feedback voltage Vfb, by supplying the Ramp current signal Iramp, which is generated by the ramp generator 3, to a MOSFET 205 side of the resistor 208 and also by extracting the Ramp current signal Iramp from a MOSFET 207 side thereof.

In the switching power-supply device as shown in FIG. 18, the Ramp superimposing circuit 2b, the ramp generator 3 serve as a feedback voltage generation unit for generating the feedback voltage Vfb2. Also, the Ramp superimposing circuit 2b serves as a superimposing unit for superimposing a ramp signal, which is depended on a voltage accumulated in the capacitor 314 of the ramp generator 3, with the feedback voltage Vfb.

In the switching power-supply device shown in FIG. 18, the feedback voltage Vfb2 having a negative-sloped signal is inputted to the inverted input terminal of the feedback comparator 1, and the first reference voltage Vref1 is inputted to the non-inverted input terminal of the feedback comparator 1. Accordingly, when the feedback voltage Vfb2 is decreased with decreasing of the output voltage Vout and thus becomes lower than the first reference voltage Vref1, the feedback comparator 1 immediately outputs the ON_TRG signal to the Trg terminal of the on-timer 4.

In this way, the switching power-supply device shown in FIG. 18 is different from that in FIG. 1 in that the ON_TRG signal is outputted by a comparison result between the feedback voltage Vfb2, which is obtained by superimposing the negative-sloped ramp signal with the feedback voltage Vfb, and the first reference voltage Vref1, but it can realize the entirely same operations as those of the switching power-supply device shown in FIG. 1.

In the foregoing, although specific embodiments of this disclosure have been explained, the embodiments are only examples, and various changes and modifications thereof may be made without departing from the spirit and the scope of the disclosure.

As described above, the followings are disclosed herein.

A disclosed switching power-supply device is configured to convert and output a first direct voltage supplied from an input power source to a second direct voltage by alternately turning on and off a first switching element connected to the input power source and a second switching element connected in series to the first switching element, and the switching power-supply device includes: a reference voltage generation unit that generates a ramp signal and generates a second reference voltage in which the ramp signal is superimposed with a first reference voltage; a comparison unit that compares a feedback voltage, which is obtained by resistance voltage dividing of the second direct voltage, with the second reference voltage and outputs an effective signal at a timing, at which the feedback voltage becomes lower than the second reference voltage; and a driving signal generation unit that receives the effective signal and then supplies a driving signal to an driving unit turning on the first switching element during a period, during which the driving signal is supplied, wherein the driving signal generation unit controls the period of supplying the driving signal to the driving unit, depending on an input-and-output condition, and wherein the reference voltage generation unit starts rising of the ramp signal during a period from a time point, at which the first switching element has been turned from on to off in response to the driving signal, to when the first switching element is turned on.

The disclosed switching power-supply device further includes a signal output unit that outputs a signal depending on a ratio between a period, during which the first switching element is turned on, and a period, during which the second switching element is turned on, wherein based on the signal, the driving signal generation unit shortens the period of supplying the driving signal as the ratio of the on-period of the second switching element to the on-period of the first switching element is increased; and wherein based on the signal, the reference voltage generation unit causes a slope of the ramp signal to become gentle as the ratio of the on-period of the second switching element to the on-period of the first switching element is increased.

The disclosed switching power-supply device further includes a signal output unit for outputting a signal depending on a difference between the first direct voltage and the second direct voltage; wherein based on the signal, the driving signal generation unit shortens the period of supplying the driving signal, as the difference between the first direct voltage and the second direct voltage is increased; and wherein based on the signal, the reference voltage generation unit causes a slope of the ramp signal to become gentle as the difference between the first direct voltage and the second direct voltage is increased.

The disclosed switching power-supply device further includes: an inductor that is connected between an output terminal and a connection point between the first switching element and the second switching element; a detection unit that detects that regeneration of the inductor has been completed; and a power supply circuit that supplies a power source voltage to the driving unit and stops operating at least during a period from when regeneration of the inductor has been completed and to when the effective signal is outputted, wherein the reference voltage generation unit includes a capacitor, a superimposing unit that superimposes a voltage accumulated in the capacitor, as the ramp signal, with the first reference voltage, and a charging-and-discharging unit that starts discharging of the capacitor at a time point, at which the first switching element is turned from on to off in response to the driving signal, and then starts charging of the capacitor until the first switching element is turned on, wherein the switching power-supply device further includes a first charging current control unit that controls a charging current, when the charging-and-discharging unit charges the capacitor, and wherein the first charging current control unit causes the charging current at least during a period, from when the regeneration of the inductor has been completed to when the driving signal is outputted, to become smaller than that during other than the period.

In the disclosed switching power-supply device, when a generation cycle of the effective signal becomes shorter than a first cycle, the reference voltage generation unit cause a slope of the ramp signal to become gentler than a case where the generation cycle is equal to or longer than the first cycle.

In the disclosed switching power-supply device, the reference voltage generation unit includes: a capacitor; a superimposing unit that superimposes a voltage accumulated in the capacitor, as the ramp signal, with the first reference voltage; and a charging-and-discharging unit that starts discharging of the capacitor at a time point, at which the first switching element is turned from on to off in response to the driving signal, and then starts charging of the capacitor until the first switching element is turned on; a voltage holding unit that holds a voltage of the capacitor at a timing, at which the first switching element is turned from off to on in response to the driving signal; and a second charging current control unit that decreases a charging current for the capacitor as the voltage held by the voltage holding unit becomes smaller, so that the slope of the ramp signal becomes gentle.

A disclosed switching power-supply device is configured to convert and output a first direct voltage supplied from an input power source to a second direct voltage by alternately turning on and off a first switching element connected to the input power source and a second switching element connected in series to the first switching element, and the switching power-supply device includes: a feedback voltage generation unit that generates a negative-sloped ramp signal and generates a feedback voltage in which the ramp signal is superimposed with a voltage obtained by resistance voltage dividing of the second direct voltage; a comparison unit that compares the feedback voltage with a reference voltage and outputs an effective signal at a timing, at which the feedback voltage becomes lower than the reference voltage; and a driving signal generation unit that receives the effective signal and then supplies a driving signal to an driving unit turning on the first switching element during a period, during which the driving signal is supplied; wherein the driving signal generation unit controls the period of supplying the driving signal to the driving unit, depending on an input-and-output conditions; and wherein the feedback voltage generation unit starts rising of the ramp signal during a period from a time point, at which the first switching element has been turned from on to off in response to the driving signal, to when the first switching element is turned on.

The disclosed switching power-supply device further includes: a signal output unit that outputs a signal depending on a ratio between a period, during which the first switching element is turned on, and a period, during which the second switching element is turned on; wherein based on the signal, the driving signal generation unit shortens the period of supplying the driving signal as the ratio of the on-period of the second switching element to the on-period of the first switching element is increased; and wherein based on the signal, the feedback voltage generation unit causes a slope of the ramp signal to become gentle as the ratio of the on-period of the second switching element to the on-period of the first switching element is increased.

The disclosed switching power-supply device further includes: a signal output unit that outputs a signal depending on a difference between the first direct voltage and the second direct voltage; wherein based on the signal, the driving signal generation unit shortens the period of supplying the driving signal, as the difference between the first direct voltage and the second direct voltage is increased; and wherein based on the signal, the feedback voltage generation unit causes a slope of the ramp signal to become gentle as the difference between the first direct voltage and the second direct voltage is increased.

The disclosed switching power-supply device further includes: an inductor that is connected between an output terminal and a connection point between the first switching element and the second switching element; a detection unit that detects that regeneration of the inductor has been completed; and a power supply circuit that supplies a power source voltage to the driving unit, adapted to stop operating at least during a period from when regeneration of the inductor has been completed to when the effective signal is outputted, wherein the feedback voltage generation unit includes a capacitor, a superimposing unit that superimposes a voltage accumulated in the capacitor, as the ramp signal, with the voltage, and a charging-and-discharging unit that starts discharging of the capacitor at a time point, at which the first switching element is turned from on to off in response to the driving signal, and then starts charging the capacitor until the first switching element is turned on; wherein the switching power-supply device further includes a first charging current control unit that controls a charging current, when the charging-and-discharging unit charges the capacitor; and wherein the first charging current control unit causes the charging current at least during a period, from when regeneration of the inductor has been completed to until the driving signal is outputted, to become smaller than that during times other than the period.

In the disclosed switching power-supply device, when a generation cycle of the effective signal becomes shorter than a first cycle, the feedback voltage generation unit cause a slope of the ramp signal to become gentler than a case where the generation cycle is equal to or longer than the first cycle.

In the disclosed switching power-supply device, the feedback voltage generation unit includes: a capacitor; a superimposing unit that superimposes a voltage accumulated in the capacitor, as the ramp signal, with the voltage; and a charging-and-discharging unit that starts discharging of the capacitor at a time point, at which the first switching element is turned from on to off in response to the driving signal, and starts charging of the capacitor until the first switching element is turned on; a voltage holding unit that holds a voltage of the capacitor at a timing, at which the first switching element is turned from off to on in response to the driving signal; and a second charging current control unit that decreases a charging current for the capacitor as the voltage held by the voltage holding unit becomes smaller, so that the slope of the ramp signal becomes gentle.

What is claimed is:

1. A switching power-supply device configured to convert and output a first direct voltage supplied from an input power source to a second direct voltage by alternately turning on and off a first switching element connected to the input power source and a second switching element connected in series to the first switching element, the switching power-supply device comprising:
   a reference voltage generation unit that generates a ramp signal and generates a second reference voltage in which the ramp signal is superimposed with a first reference voltage;
   a comparison unit that compares a feedback voltage, which is obtained by resistance voltage dividing of the second direct voltage, with the second reference voltage and outputs an effective signal at a timing, at which the feedback voltage becomes lower than the second reference voltage; and
   a driving signal generation unit that receives the effective signal and then supplies a driving signal to a driving unit turning on the first switching element during a period, during which the driving signal is supplied,
   a signal output unit that outputs a signal depending on a ratio between a period, during which the first switching element is turned on, and a period, during which the second switching element is turned on,
   wherein the driving signal generation unit controls the period of supplying the driving signal to the driving unit, depending on an input-and-output condition,
   wherein the reference voltage generation unit starts rising of the ramp signal during a period from a time point, at which the first switching element has been turned from on to off in response to the driving signal, to when the first switching element is turned on,
   wherein based on the signal, the driving signal generation unit shortens the period of supplying the driving signal as the ratio of the on-period of the second switching element to the on-period of the first switching element is increased, and
   wherein based on the signal, the reference voltage generation unit causes a slope of the ramp signal to become gentle as the ratio of the on-period of the second switching element to the on-period of the first switching element is increased.

2. The switching power-supply device according to claim 1,
   wherein the signal output unit outputs the signal depending on a difference between the first direct voltage and the second direct voltage;
   wherein based on the signal, the driving signal generation unit shortens the period of supplying the driving signal, as the difference between the first direct voltage and the second direct voltage is increased; and
   wherein based on the signal, the reference voltage generation unit causes a slope of the ramp signal to become gentle as the difference between the first direct voltage and the second direct voltage is increased.

3. The switching power-supply device according to claim 1, further comprising:
- an inductor that is connected between an output terminal and a connection point between the first switching element and the second switching element;
- a detection unit that detects that regeneration of the inductor has been completed; and
- a power supply circuit that supplies a power source voltage to the driving unit and stops operating at least during a period from when regeneration of the inductor has been completed to when the effective signal is outputted,
- wherein the reference voltage generation unit comprises a capacitor, a superimposing unit that superimposes a voltage accumulated in the capacitor, as the ramp signal, with the first reference voltage, and a charging-and-discharging unit that starts discharging of the capacitor at a time point, at which the first switching element is turned from on to off in response to the driving signal, and then starts charging the capacitor until the first switching element is turned on,
- wherein the switching power-supply device further comprises a first charging current control unit that controls a charging current, when the charging-and-discharging unit charges the capacitor, and
- wherein the first charging current control unit causes the charging current at least during a period, from when the regeneration of the inductor has been completed to when the driving signal is outputted, to become smaller than that during times other than the period.

4. The switching power-supply device according to claim 1, wherein when a generation cycle of the effective signal becomes shorter than a first cycle, the reference voltage generation unit cause a slope of the ramp signal to become gentler than a case where the generation cycle is equal to or longer than the first cycle.

5. The switching power-supply device according to claim 4, wherein the reference voltage generation unit comprises:
- a capacitor;
- a superimposing unit that superimposes a voltage accumulated in the capacitor, as the ramp signal, with the first reference voltage;
- a charging-and-discharging unit that starts discharging of the capacitor at a time point, at which the first switching element is turned from on to off in response to the driving signal, and then starts charging of the capacitor until the first switching element is turned on;
- a voltage holding unit that holds a voltage of the capacitor at a timing, at which the first switching element is turned from off to on in response to the driving signal; and
- a second charging current control unit that decreases a charging current for the capacitor as the voltage held by the voltage holding unit becomes smaller, so that the slope of the ramp signal becomes gentle.

6. A switching power-supply device configured to convert and output a first direct voltage supplied from an input power source to a second direct voltage by alternately turning on and off a first switching element connected to the input power source and a second switching element connected in series to the first switching element, the switching power-supply device comprising:
- a feedback voltage generation unit that generates a negative-sloped ramp signal and generates a feedback voltage in which the ramp signal is superimposed with a voltage obtained by resistance voltage dividing of the second direct voltage;
- a comparison unit that compares the feedback voltage with a reference voltage and outputs an effective signal at a timing, at which the feedback voltage becomes lower than the reference voltage; and
- a driving signal generation unit that receives the effective signal and then supplies a driving signal to a driving unit turning on the first switching element during a period, during which the driving signal is supplied,
- wherein the driving signal generation unit controls the period of supplying the driving signal to the driving unit, depending on an input-and-output condition, and
- wherein the feedback voltage generation unit starts rising of the ramp signal during a period from a time point, at which the first switching element has been turned from on to off in response to the driving signal, to when the first switching element is turned on.

7. The switching power-supply device according to claim 6, further comprising:
- a signal output unit that outputs a signal depending on a ratio between a period, during which the first switching element is turned on, and a period, during which the second switching element is turned on,
- wherein based on the signal, the driving signal generation unit shortens the period of supplying the driving signal as the ratio of the on-period of the second switching element to the on-period of the first switching element is increased, and
- wherein based on the signal, the feedback voltage generation unit causes a slope of the ramp signal to become gentle as the ratio of the on-period of the second switching element to the on-period of the first switching element is increased.

8. The switching power-supply device according to claim 6, further comprising:
- a signal output unit that outputs a signal depending on a difference between the first direct voltage and the second direct voltage;
- wherein based on the signal, the driving signal generation unit shortens the period of supplying the driving signal, as the difference between the first direct voltage and the second direct voltage is increased; and
- wherein based on the signal, the feedback voltage generation unit causes a slope of the ramp signal to become gentle as the difference between the first direct voltage and the second direct voltage is increased.

9. The switching power-supply device according to claim 6, further comprising:
- an inductor that is connected between an output terminal and a connection point between the first switching element and the second switching element;
- a detection unit that detects that regeneration of the inductor has been completed; and
- a power supply circuit that supplies a power source voltage to the driving unit, adapted to stop operating at least during a period from when regeneration of the inductor has been completed to when the effective signal is outputted,
- wherein the feedback voltage generation unit comprises a capacitor, a superimposing unit that superimposes a voltage accumulated in the capacitor, as the ramp signal, with the voltage, and a charging-and-discharging unit that starts discharging of the capacitor at a time point, at which the first switching element is turned from on to off in response to the driving signal, and then starts charging the capacitor until the first switching element is turned on;
- wherein the switching power-supply device further comprises a first charging current control unit that controls a charging current, when the charging-and-discharging unit charges the capacitor; and wherein the first charging current control unit causes the charging current at least during a period, from when regeneration of the inductor has been completed to until the driving signal is outputted, to become smaller than that during times other than the period.

10. The switching power-supply device according to claim 6, wherein when a generation cycle of the effective signal becomes shorter than a first cycle, the feedback voltage generation unit cause a slope of the ramp signal to become gentler than a case where the generation cycle is equal to or longer than the first cycle.

11. The switching power-supply device according to claim 10, wherein the feedback voltage generation unit comprises:
a capacitor;
a superimposing unit that superimposes a voltage accumulated in the capacitor, as the ramp signal, with the voltage;
a charging-and-discharging unit that starts discharging of the capacitor at a time point, at which the first switching element is turned from on to off in response to the driving signal, and starts charging of the capacitor until the first switching element is turned on;
a voltage holding unit that holds a voltage of the capacitor at a timing, at which the first switching element is turned from off to on in response to the driving signal; and
a second charging current control unit that decreases a charging current for the capacitor as the voltage held by the voltage holding unit becomes smaller, so that the slope of the ramp signal becomes gentle.

* * * * *